US012634691B2

(12) United States Patent
Yoon et al.

(10) Patent No.: US 12,634,691 B2
(45) Date of Patent: May 19, 2026

(54) METHOD AND DEVICE FOR PROVIDING EVENT IN WIRELESS COMMUNICATION SYSTEM

(71) Applicant: Samsung Electronics Co., Ltd., Suwon-si (KR)

(72) Inventors: Kangjin Yoon, Suwon-si (KR); Sujung Kang, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 17/821,000

(22) Filed: Aug. 19, 2022

(65) Prior Publication Data

US 2023/0054892 A1       Feb. 23, 2023

(30) Foreign Application Priority Data

Aug. 20, 2021    (KR) ........................ 10-2021-0110150
May 26, 2022    (KR) ........................ 10-2022-0064842

(51) Int. Cl.
   *H04W 12/069*      (2021.01)
   *H04L 9/32*      (2006.01)
   *H04W 8/18*      (2009.01)

(52) U.S. Cl.
   CPC ......... *H04W 12/069* (2021.01); *H04L 9/3247* (2013.01); *H04L 9/3268* (2013.01);
   (Continued)

(58) Field of Classification Search
   CPC ..... H04L 2209/80; H04L 67/51; H04L 67/55;
                H04L 9/0643; H04L 9/3247;
   (Continued)

(56) References Cited

U.S. PATENT DOCUMENTS 9,276,917 B2 *   3/2016  McColgan .............. H04L 67/55
10,285,050 B2 *  5/2019  Park ...................... H04W 12/35
                (Continued)

FOREIGN PATENT DOCUMENTS

CN       109495429 B       8/2020
CN       109792601 B       4/2021
                (Continued)

OTHER PUBLICATIONS

Translation of CN 109495429 B (app filed Sep. 12, 2017 and transl obtained Aug. 19, 2024) (Year: 2017).*
                (Continued)

*Primary Examiner* — Sharon S Lynch

(57)       ABSTRACT
The disclosure relates to a 5G or 6G communication system for supporting a higher data transmission rate. A method performed by a terminal in a wireless communication system is provided. The method comprises transmitting to a subscription manager discovery service (SM-DS) information indicating a support of a push service, receiving from the SM-DS a list of push services supported by the SM-DS, selecting at least one push service based on the list of push services supported by the SM-DS, generating an embedded Universal Integrated Circuit Card (eUICC) signature based on an indicator indicating at least one selected push service and a push token, and transmitting to the SM-DS the indicator, the push token, and the eUICC signature.

14 Claims, 12 Drawing Sheets

(52) U.S. Cl.
 CPC ........... *H04L 9/3273* (2013.01); *H04W 8/183* (2013.01); *H04L 2209/80* (2013.01)

(58) Field of Classification Search
 CPC ... H04L 9/3265; H04L 9/3268; H04L 9/3273; H04W 12/069; H04W 12/48; H04W 12/71; H04W 12/72; H04W 8/18; H04W 8/183; H04W 8/205
 See application file for complete search history.

(56) References Cited

U.S. PATENT DOCUMENTS

| | | | | |
|---|---|---|---|---|
| 10,439,823 B2 * | 10/2019 | Park | | H04L 9/3066 |
| 10,666,660 B2 * | 5/2020 | Park | | H04W 8/205 |
| 10,735,945 B2 * | 8/2020 | Lee | | H04L 9/3271 |
| 10,769,279 B2 * | 9/2020 | Yang | | G06F 21/572 |
| 10,893,406 B2 * | 1/2021 | Lee | | H04W 48/18 |
| 10,924,923 B2 * | 2/2021 | Park | | H04L 9/3263 |
| 10,939,279 B2 * | 3/2021 | Park | | H04W 4/38 |
| 10,965,470 B2 * | 3/2021 | Park | | H04L 63/12 |
| 10,985,926 B2 * | 4/2021 | Yang | | H04W 12/42 |
| 11,026,081 B2 * | 6/2021 | Roy | | H04W 4/70 |
| 11,076,295 B2 * | 7/2021 | Cheng | | H04W 12/35 |
| 11,146,568 B2 * | 10/2021 | Park | | H04W 8/205 |
| 11,496,883 B2 * | 11/2022 | Lee | | H04L 9/3271 |
| 11,516,650 B2 * | 11/2022 | Chaugule | | H04W 12/40 |
| 11,622,259 B2 * | 4/2023 | Roy | | H04W 12/40 |
| | | | | 455/419 |
| 11,700,528 B2 * | 7/2023 | Lee | | H04W 4/14 |
| | | | | 380/270 |
| 11,838,752 B2 * | 12/2023 | Park | | H04W 8/205 |
| 11,864,267 B2 * | 1/2024 | Chaugule | | H04W 8/205 |
| 2014/0075515 A1 * | 3/2014 | McColgan | | H04W 12/069 |
| | | | | 726/4 |
| 2016/0301529 A1 * | 10/2016 | Park | | H04W 8/205 |
| 2017/0064552 A1 * | 3/2017 | Park | | H04L 9/3273 |
| 2018/0070224 A1 * | 3/2018 | Park | | H04W 12/10 |
| 2018/0123803 A1 * | 5/2018 | Park | | H04L 9/14 |
| 2018/0131699 A1 * | 5/2018 | Park | | H04L 63/0281 |
| 2018/0234837 A1 * | 8/2018 | Lee | | H04W 8/183 |
| 2019/0065749 A1 * | 2/2019 | Yang | | G06F 21/572 |
| 2019/0074983 A1 * | 3/2019 | Yang | | H04L 9/3265 |
| 2019/0140837 A1 * | 5/2019 | Cheng | | H04W 8/20 |
| 2019/0268765 A1 * | 8/2019 | Park | | H04W 12/10 |
| 2019/0380026 A1 * | 12/2019 | Lee | | H04W 8/26 |
| 2020/0052907 A1 * | 2/2020 | Park | | H04L 63/0869 |
| 2020/0128390 A1 * | 4/2020 | Lee | | H04W 12/35 |
| 2020/0287907 A1 * | 9/2020 | Park | | H04L 67/30 |
| 2020/0367049 A1 * | 11/2020 | Lee | | H04W 12/35 |
| 2021/0076195 A1 * | 3/2021 | Chaugule | | H04W 12/40 |
| 2021/0084485 A1 * | 3/2021 | Roy | | H04W 12/35 |
| 2021/0168598 A1 * | 6/2021 | Park | | H04W 8/205 |
| 2021/0250751 A1 * | 8/2021 | Roy | | H04W 12/40 |
| 2022/0210722 A1 * | 6/2022 | Saini | | H04W 84/12 |
| 2022/0232385 A1 * | 7/2022 | Seo | | H04W 8/183 |
| 2023/0018945 A1 * | 1/2023 | Chaugule | | H04W 12/40 |

FOREIGN PATENT DOCUMENTS

| | | | | |
|---|---|---|---|---|
| EP | 3297309 A1 | 3/2018 | | |
| EP | 3557895 B1 * | 10/2019 | | H04W 8/20 |
| KR | 10-2017-0140809 A | 12/2017 | | |

OTHER PUBLICATIONS

"RSP Technical Specification, Version 2.3", Jun. 30, 2021, 275 pages.

International Search Report and Written Opinion of the International Searching Authority dated Nov. 21, 2022 in connection with International Patent Application No. PCT/KR2022/012406, 7 pages.

Supplementary European Search Report dated Jul. 23, 2024, in connection with European Patent Application No. 22858795.2, 9 pages.

Communication pursuant to Article 94(3) EPC dated Apr. 14, 2025, in connection to European Application No. 22858795.2, 6 pages.

* cited by examiner

1100

1110

Transceiver

1120

Controller

1130

Memory

1200

1210                    1220                    1230

| Transceiver | Controller | Memory |

METHOD AND DEVICE FOR PROVIDING EVENT IN WIRELESS COMMUNICATION SYSTEM

CROSS-REFERENCE TO RELATED APPLICATION(S)

This application is based on and claims priority under 35 U.S.C. 119 to Korean Patent Application No. 10-2021-0110150 filed Aug. 20, 2021, and Korean Patent Application No. 10-2022-0064842, filed May 26, 2022, in the Korean Intellectual Property Office, the disclosure of which is herein incorporated by reference in their entirety.

BACKGROUND

1. Field

Various embodiments of the disclosure relate to a method and a device for providing, with respect to a registered event, event registration information to a terminal by a subscription relay server.

Various embodiments of the disclosure relate to a method and a device for registering and updating, by a terminal and a subscription relay server, an event registration notification identifier for providing event registration information.

Various embodiments of the disclosure relate to a method and a device for registering an event by a profile server in at least one subscription relay server and deleting the event.

Various embodiments of the disclosure relate to a method and a device for establishing a communication connection by downloading and installing a communication service to a terminal in a communication system.

Various embodiments of the disclosure relate to a method and a device for downloading online a profile in a communication system, and installing and managing the profile.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 preprocessing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Various embodiments of the disclosure may provide a method and a device for selecting a communication service to establish a communication connection by a terminal in a communication system.

Various embodiments of the disclosure may provide a method and a device for downloading online, by a terminal, a profile for establishing a communication connection in a communication system, and installing and managing the same.

Various embodiments of the disclosure may provide a method and a device for efficiently downloading an event by a terminal in a communication system.

Various embodiments of the disclosure may provide a method and a device for accessing at least one subscription relay server by a terminal to register an event registration notification identifier for receiving a registration notification of an event assigned to the terminal.

Various embodiments of the disclosure may provide a method and a device for accessing at least one subscription relay server by a terminal to acquire an event assigned to the terminal.

Various embodiments of the disclosure may provide a method and a device for registering the same event in at least one subscription relay server by a profile providing server.

Various embodiments of the disclosure may provide a method and a device for selecting whether to provide an event registration notification function when a profile providing server registers an event in at least one subscription relay server.

Various embodiments of the disclosure may provide a method and a device for deleting, by a profile providing server, an event registered in at least one subscription relay server.

Various embodiments of the disclosure may provide a method for exchanging a message between a terminal, a subscription relay server (a subscription manager discovery service (SM-DS)), and a profile providing server (a subscription manager data preparation plus (SM-DP+)).

The disclosure for solving the above problems provides a method for processing a control signal in a wireless communication system, the method including: receiving a first control signal transmitted from a base station; processing the received first control signal; and transmitting a second control signal generated based on the processing to the base station.

A terminal in a wireless communication system according to various embodiments of the disclosure may include: a transceiver; and at least one processor, wherein the at least one processor is configured to control the transceiver to transmit a first message for registering a supported event registration notification service and an event registration notification identifier to a subscription relay server, receive event registration notification identifier registration result information from the subscription relay server in response to the message, when an event registration notification is received, transmit a second message for requesting an event to the subscription relay server, based on the event registration notification identifier registration result information, and receive event processing-related information from the subscription relay server in response to the second message.

A profile providing server in a wireless communication system according to various embodiments of the disclosure may include: a transceiver; and at least one processor, wherein the at least one processor is configured to control the transceiver to receive an event generation and event registration request message to at least one subscription relay server from a service provider server, and control the transceiver to generate an event corresponding to the request message and register the event in the at least one subscription relay server.

A subscription relay server in a wireless communication system according to various embodiments of the disclosure may include: a transceiver; and at least one processor, wherein the at least one processor is configured to control the transceiver to receive an event registration request message from a profile providing server or another subscription relay server in order to register an event, and is configured to register the event in response to the event registration request message, and the event is related to an event generated by the profile providing server.

A profile providing server in a wireless communication system according to various embodiments of the disclosure may include: a transceiver; and at least one processor, wherein the at least one processor is configured to control the transceiver to receive an event request message from a terminal, and control the transceiver to determine validity of event-related information included in the event request message, and transmit event processing-related information to the terminal, based on the validity determination of the event-related information.

The technical subjects pursued in the disclosure may not be limited to the above mentioned technical subjects, and other technical subjects which are not mentioned may be clearly understood, through the following descriptions, by those skilled in the art to which the disclosure pertains.

According to various embodiments of the disclosure, a terminal in a communication system may request an event registered in at least one subscription relay server.

According to various embodiments of the disclosure, a terminal in a communication system may register an event registration notification identifier in at least one subscription relay server.

According to various embodiments of the disclosure, a profile providing server in a communication system may generate an event according to a request of a service provider server and register the corresponding event in at least one subscription relay server.

According to various embodiments of the disclosure, a profile providing server in a communication system may generate an event according to a request of a service provider server and register the corresponding event in at least one subscription relay server, and the subscription relay server may permit the use of an event registration notification function with respect to the corresponding event.

According to various embodiments of the disclosure, in case of requesting a subscription relay server to register an event, a profile providing server in a communication system may include, in the request, a message for requesting a third subscription relay server to register a corresponding event corresponding to the event after the subscription relay server registers the event.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, intercon- nect with, contain, be contained within, connect to or with, couple to or with, be communicable with, cooperate with, interleave, juxtapose, be proximate to, be bound to or with, have, have a property of, or the like; and the term "control- ler" means any device, system or part thereof that controls at least one operation, such a device may be implemented in hardware, firmware or software, or some combination of at least two of the same. It should be noted that the function- ality associated with any particular controller may be cen- tralized or distributed, whether locally or remotely.

Moreover, various functions described below can be implemented or supported by one or more computer pro- grams, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other commu- nication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
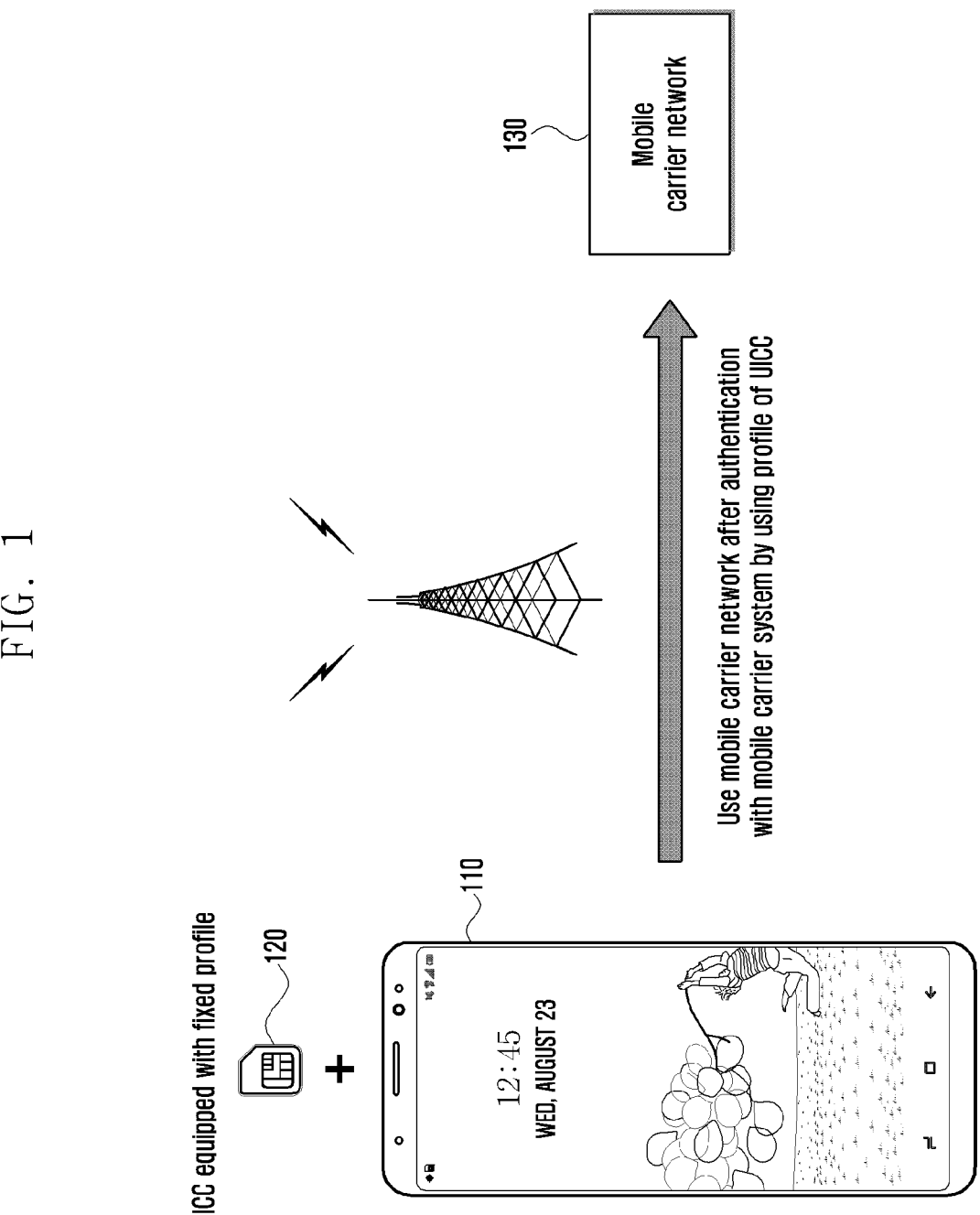
FIG. 1 illustrates a method in which a terminal connects to a mobile communication network by using a universal integrated circuit card (UICC) equipped with a fixed profile according to various embodiments of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will under- stand that the principles of the present disclosure may be implemented in any suitably arranged system or device.

Hereinafter, embodiments of the disclosure will be described in detail with reference to the accompanying drawings.

In describing the embodiments, descriptions related to technical contents well-known in the art and not associated directly with the disclosure will be omitted. Such an omis- sion of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not com- pletely reflect the actual size. In the drawings, identical or corresponding elements are provided with identical refer- ence numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Particular terms as used in the following description are merely provided to help understanding pf the disclosure, and other types of terms may be used without departing from the scope of the technical idea of the disclosure.

In the disclosure, a modifier, such as "a first" or "a second", referring to a term, may be used to distinguish between terms in describing an embodiment. A term modified by a modifier such as "a first" or "a second" may refer to a different object. However, a term modified by a modifier such as "a first" or "a second" may refer to the same object. That is, a modifier such as "a first" or "a second" may be used to refer to the same object from a different viewpoint. For example, a modifier such as "a first" or "a second" may be used to distinguish the same object in terms of a functional aspect or an operational aspect. For example, a first user and a second user may refer to the same user.

First, terms used in the disclosure are defined.

A universal integrated circuit card (UICC) is a smart card inserted and used in a mobile communication terminal, etc., and may also be referred to as a UICC card. The UICC may include an access control module for accessing a network of a mobile communication service provider. Examples of the access control module include a universal subscriber identity module (USIM), a subscriber identity module (SIM), an IP multimedia service identity module (ISIM), and the like. A UICC including a USIM is generally referred to as a USIM card. Similarly, a UICC including a SIM module is generally referred to as a SIM card.

The terms "a SIM card", "a UICC card", "a USIM card", and "a UICC including an ISIM" disclosed in the disclosure may have the same meaning in the disclosure. That is, even for a SIM card, the technology of the SIM card may be equally applied to even a USIM card, an ISIM card, or a general UICC card.

The SIM card stores personal information of a mobile communication subscriber and performs subscriber authentication and traffic security key generation upon an access to a mobile communication network, thereby enabling the safe use of mobile communication.

At the time point of proposing the disclosure, the SIM card is generally manufactured as a dedicated card for a corresponding service provider by a request of a specific mobile communication service provider upon manufacturing of a card, and a card in which authentication information for network access of the corresponding service provider, for example, an universal subscriber identity module (USIM) application and an international mobile subscriber identity (IMSI), a K value, an OPc value, etc., is mounted in advance has been released. Therefore, the corresponding mobile communication service provider receives the manufactured SIM card and provides the same to a subscriber. Thereafter, if necessary, technology of over the air (OTA) or the like may be used to perform management such as installation, modification, and deletion of an application within the UICC. A subscriber inserts a UICC card into his/her own mobile communication terminal to use a network of a corresponding mobile communication service provider and application services, and when replacing the terminal, the subscriber takes out the UICC card from the existing terminal and inserts the UICC card into a new terminal, such that the new terminal may use authentication information, a mobile communication telephone number, a personal telephone directory, and the like, which are stored in the UICC card, as they are.

However, the SIM card is inconvenient for a mobile communication terminal user in receiving services of other mobile carriers. There is inconvenience that the mobile communication terminal user needs to physically get a SIM card to receive a service from a mobile communication service provider. For example, there is inconvenience that when a mobile communication terminal user travels to other countries, he/she needs to get a local SIM card to receive a local mobile communication service. A roaming service may somewhat solve the foregoing inconveniences but there is a problem in that a mobile communication terminal user may not receive the roaming service due to an expensive fee and when a contract between mobile carriers is not established.

A significant portion of the foregoing inconveniences may be solved by remotely downloading and installing a SIM module to and in a UICC card. That is, a SIM module of a mobile communication service desired to be used at a user's desired time point may be downloaded to the UICC card. Such a UICC card may also download and install a plurality of SIM modules and may select and use only one of the plurality of SIM modules. The UICC card may be fixed in a terminal or may not be fixed in the terminal. In particular, a UICC, which is fixed to a terminal and used, is called an embedded UICC (eUICC). In general, the eUICC refers to a UICC card which is fixed to a terminal and used and can remotely download and select a SIM module. In the disclosure, an eUICC card which can remotely download and select a SIM module is commonly called an eUICC. That is, a UICC card that is fixed or not fixed to a terminal among UICC cards which can remotely download and select SIM modules is commonly called an eUICC. Further, downloaded SIM module information is commonly used as a term called an eUICC profile or, more simply, a profile.

Hereinafter, terms used in the disclosure will be described in more detail.

In the disclosure, a UICC is a smart card which is inserted and used in a mobile communication terminal, and refers to a chip in which personal information, such as network access authentication information, a telephone directory, and an SMS of a mobile communication subscriber is stored and which enables the safe use of mobile communication by performing subscriber authentication and traffic security key generation upon an access to a mobile communication network, such as GSM, WCDMA, or LTE. The UICC may be loaded with a communication application, such as a subscriber identification module (SIM), a universal SIM (USIM), or an IP multimedia SIM (ISIM) depending on the type of mobile communication network which a subscriber accesses, and may provide a high-level security function for loading various applications, such as electronic wallet, ticketing, and e-passport.

In the disclosure, an eUICC (embedded UICC) is a security module in the form of a chip embedded in a terminal, not a detachable type that can be inserted into and removed from the terminal. The eUICC may download and install a profile by using over-the-air (OTA) technology. The eUICC may be named as a UICC which can download and install a profile.

In the disclosure, a method for downloading and installing a profile in an eUICC by using OTA technology may be applied even to a detachable UICC which can be inserted into and removed from a terminal. That is, an embodiment of the disclosure may be applied to a UICC which can download and install a profile by using the OTA technology.

In the disclosure, the term "UICC" may be used interchangeably with "SIM", and the term "eUICC" may be used interchangeably with "eSIM".

In the disclosure, a profile may mean that an application, a file system, an authentication key value, and the like, stored in an UICC are packaged in the form of software.

In the disclosure, a USIM profile may have the same meaning as a profile or may mean that information included in a USIM application within the profile is packaged in the form of software.

In the disclosure, an operation of enabling a profile by a terminal may refer to an operation of changing a state of a corresponding profile to an enabled state and configuring a terminal to enable reception of a communication service through a communication service provider having provided the corresponding profile. The profile in the enabled state may be expressed as an "enabled profile".

In the disclosure, an operation of disabling a profile by a terminal may refer to an operation of changing a state of a corresponding profile to a disabled state and configuring a terminal not to enable reception of a communication service through a communication service provider having provided the corresponding profile. The profile in the disabled state may be expressed as a "disabled profile".

In the disclosure, an operation of deleting a profile by a terminal may refer to an operation of changing a state of a corresponding profile to a deleted state and configuring a terminal such that the corresponding profile can no longer be enabled or disabled by the terminal. The profile in the deleted state may be expressed as a "deleted profile".

In the disclosure, an operation of enabling, disabling, or deleting a profile by a terminal may refer to an operation of only marking each profile as to be enabled, to be disabled, or to be deleted without immediately changing a state of each profile to an enabled state, a disabled state, or a deleted state, and changing a state of each profile to be enabled, disabled, or deleted after a terminal or a UICC of the terminal performs a specific operation (for example, performing of a refresh (REFRESH) or initialization (RESET) command). The operation of marking a specific profile to be in a predetermined state (i.e., to be enabled, to be disabled, or to be deleted) is not necessarily limited to displaying one predetermined state with respect to one profile. It is also possible to display one or more profiles in the same or different predetermined states, display one profile in one or more predetermined states, or display one or more profiles in one or more predetermined states equal to or different from each other, respectively.

In addition, when a terminal displays one or more predetermined states for a certain profile, two displays may be combined into one. For example, when a certain profile is marked as to be disabled and to be deleted, the corresponding profile may also be combined and marked as to be disabled and deleted.

In addition, an operation of displaying a predetermined state with respect to one or more profiles by a terminal may be performed sequentially or simultaneously. In addition, an operation of displaying a predetermined state with respect to one or more profiles by a terminal and then changing an actual profile state may be performed sequentially or simultaneously.

In the disclosure, a profile providing server includes a function of generating a profile, encrypting the generated profile, generating a profile remote management command, or encrypting the generated profile remote management command, and may be expressed as subscription manager data preparation (SM-DP), subscription manager data preparation plus (SM-DP+), off-card entity of profile domain, a profile encryption server, a profile creation server, a profile provisioner (PP), a profile provider, and a profile provisioning credentials holder (PPC holder).

In the disclosure, a profile management server may be expressed as subscription manager secure routing (SM-SR), subscription manager secure routing plus (SM-SR+), off-card entity of eUICC profile manager or a profile management credentials holder (PMC holder), and an eUICC manager (EM).

When referring to the profile providing server in the disclosure, it may also refer to a combination of the functions of the profile management server. Therefore, in various embodiments of the disclosure, that is, in the following description, the operation of the profile providing server is also possible in the profile management server. In the same manner, obviously, operations describing the profile management server or SM-SR may be performed in the profile providing server.

In the disclosure, a subscription relay server may be expressed as a subscription manager discovery service (SM-DS), a discovery service (DS), a root subscription relay server (root SM-DS), and an alternative subscription relay server (alternative SM-DS). The subscription relay server may receive an event registration request (register event request or event register request) from one or more profile providing servers or subscription relay servers. In addition, one or more subscription relay servers may be used in combination, and in this case, a first subscription relay server may receive an event registration request from a second subscription relay server as well as the profile providing server.

In the disclosure, the profile providing server and the subscription relay server may be collectively referred to as a "remote SIM provisioning (RSP) server". The RSP server may be expressed as subscription manager XX (SM-XX).

In the disclosure, eSIM capability may be collectively referred to as "remote SIM provisioning capability or RSP capability".

The term "terminal" used in the disclosure may be referred to as a mobile station (MS), user equipment (UE), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of the terminal may include not only a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback home appliances having a wireless communication function, and Internet home appliances capable of wireless Internet access and browsing, but also a portable unit or terminals incorporating combinations of such functions. In addition, the terminal may include a machine to machine (M2M) terminal and a machine type communication (MTC) terminal/device, but is not limited thereto. In the disclosure, a terminal may be referred to as an electronic device.

In the disclosure, an electronic device may have a built-in UICC which can download and install a profile. When the UICC is not embedded in the electronic device, the UICC physically separated from the electronic device may be inserted into the electronic device and connected to the electronic device. For example, the UICC in the form of a card may be inserted into the electronic device. The electronic device may include a terminal, and in this case, the terminal may be a terminal including a UICC which can download and install a profile. The UICC may be embedded in the terminal, and when the terminal and the UICC are separated, the UICC may be inserted into the terminal and connected to the terminal. The UICC which can download and install a profile may be referred to as, for example, an eUICC.

In the disclosure, the terminal or the electronic device may include software or an application installed in the terminal or the electronic device to control the UICC or the eUICC. The software or the application installed in the terminal or the electronic device to control the UICC or the eUICC may be referred to as, for example, a local profile assistant (LPA).

In the disclosure, a profile delimiter may be referred to as a factor matching a profile identifier (profile ID), an integrated circuit card ID (ICCID), a matching ID, an event identifier (event ID), an activation code, an activation code token, a command code, a command code token, a signed command code, an unsigned command code, an ISD-P, or profile domain (PD). The profile ID may indicate a unique identifier of each profile. The profile delimiter may further include an address of the profile providing server (SM-DP+) which can index a profile. In addition, the profile delimiter may further include a signature of the profile providing server (SM-DP+).

In the disclosure, an eUICC identifier (eUICC ID) may be a unique identifier of the eUICC embedded in the terminal, and may be referred to as an EID. In addition, when a provisioning profile is pre-loaded in the eUICC, the eUICC ID may be a profile ID of a corresponding provisioning profile. In addition, as in an embodiment of the disclosure, when the terminal and the eUICC chip are not separated, the eUICC ID may be a terminal ID. In addition, the eUICC ID may refer to a specific secure domain of an eUICC chip.

In the disclosure, a profile container may be called a profile domain. The profile container may be a security domain.

In the disclosure, an application protocol data unit (APDU) may be a message for the terminal to interwork with the eUICC. In addition, the APDU may be a message for a PP or PM to interwork with the eUICC.

In the disclosure, profile provisioning credentials (PPC) may be a means used for mutual authentication, profile encryption, and signing between the profile providing server and the eUICC. The PPC may include one or more of a symmetric key, a Rivest Shamir Adleman (RSA) certificate and a private key, an elliptic curved cryptography (ECC) certificate and a private key, a root certification authority (CA), and a certificate chain. In addition, when a plurality of profile providing servers exist, a different PPC for each of the plurality of profile providing servers may be stored or used in the eUICC.

In the disclosure, profile management credentials (PMC) may be a means used for mutual authentication, transmission data encryption, and signing between the profile management server and the eUICC. The PMC may include one or more of a symmetric key, an RSA certificate, and a private key, an ECC certificate and a private key, a root CA, and a certificate chain. In addition, when a plurality of profile management servers exist, a different PMC for each of the plurality of profile management servers may be stored or used in the eUICC.

In the disclosure, an AID may be an application identifier. This value may be a delimiter which distinguishes different applications within the eUICC.

In the disclosure, an event may be a general term for profile download, remote profile management, or other profile or eUICC management/processing commands. The event may be named as a remote SIM provisioning operation (or RSP operation) or an event record, and each event may be referred to as data including at least one of a corresponding event identifier (Event ID or EventID) or matching identifier (matching ID or matchingID), an address (FQDN, IP address, or URL) of a profile providing server (SM-DP+) or an subscription relay server (SM-DS) in which a corresponding event is stored, a signature of the profile providing server (SM-DP+) or the subscription relay server (SM-DS), and a digital certificate of the profile providing server (SM-DP+) or the subscription relay server (SM-DS). Data corresponding to the event may be referred to as an activation code or a command code. A part or all of a procedure for using a command code may be referred to as an "activation code processing procedure", "command code processing procedure", "activation code procedure", "command code procedure", "local profile assistant application programming interface (LPA API)", "LPA API procedure", or "LPA API processing procedure". The profile download may be used interchangeably with profile installation. In addition, an event type may also be used as a term to indicate whether a specific event is a profile download, remote profile management (for example, delete, enable, disable, replace, update, or the like), or other profiles or eUICC management/processing commands, and may be named as an operation type (OperationType), an event classification (Operation-Class), an event request type, an event classification (event class), an event request classification (event request class), or the like. As for a certain event identifier (EventID or MatchingID), a path or usage purpose (EventID Source or MatchingID Source) from which the terminal has obtained the corresponding event identifier (EventID or MatchingID) may be designated.

In the disclosure, an event registration notification may be a general term for an operation of, when an event is registered in a subscription relay server in order for an eUICC of a terminal, notifying the terminal that the event is registered. The event registration notification may include a process of, when an event for an eUICC of a terminal is registered in a subscription relay server, transmitting an event registration notification identifier corresponding to the corresponding eUICC to an event registration notification server, and transmitting, by the event registration notification server, the event registration notification identifier or whether the event is registered to a terminal corresponding to the event registration notification identifier.

In the disclosure, an event registration notification identifier (event registration notification ID, push token, etc.) is an identifier used for event registration notification corresponding to an identifier of an eUICC of a terminal in a subscription relay server. When an event for the eUICC of the terminal is registered, the subscription relay server may transmit an event registration notification identifier corresponding to the corresponding eUICC to an event registration notification server. The event registration notification identifier may be generated through the interaction between the event registration notification server and the terminal. The event registration notification identifier may be stored in the subscription relay server through the interaction between the terminal and the subscription relay server in response to an eUICC identifier of the terminal. In the disclosure, the event registration notification identifier may be used interchangeably with a push token.

In the disclosure, the event registration notification server serves to notify the terminal of registration of an event registered in the subscription relay server. In the disclosure, the event registration notification server may be used interchangeably with a push service server.

In the disclosure, a profile package may be used interchangeably with a profile or used as a term indicating a data object of a specific profile, and may be named as profile TLV or profile package TLV. When the profile package is encrypted using an encryption parameter, the profile package may be named as a protected profile package (PPP) or a protected profile package TLV (PPP TLV). When the profile package is encrypted using an encryption parameter which can be decrypted only by a specific eUICC, the profile package may be named as a bound profile package (BPP) or a bound profile package TLV (BPP TLV). The profile package TLV may be a data set representing information which configures a profile in a tag, length, value (TLV) format.

In the disclosure, local profile management (LPM) may be named as profile local management, local management, a local management command, a local command, a local profile management package (LPM package), a profile local management package, a local management package, a local management command package, or a local command package. The LPM may be used for changing a state (enabled, disabled, or deleted) of a specific profile or updating contents (for example, a profile nickname or profile summary information (profile metadata), etc.) of a specific profile through software installed in a terminal, etc. The LPM may include one or more local management commands, and in this case, a profile, which is a target of each local management command, may be the same or different for each local management command.

In the disclosure, remote profile management (RPM) may be named as profile remote management, remote management, a remote management command, a remote command, a remote profile management package (RPM package), a profile remote management package, a remote management package, a remote management command package, or a remote command package. The RPM may be used for changing a state (enabled, disabled, or deleted) of a specific profile or updating contents (for example, a profile nickname or profile summary information (profile metadata), etc.) of a specific profile. The RPM may include one or more remote management commands, and in this case, a profile, which is a target of each remote management command, may be the same or different for each remote management command.

In the disclosure, a certificate or a digital certificate may indicate a digital certificate used for mutual authentication based on an asymmetric key configured by a pair including a public key (PK) and a secret key (SK). Each certificate may include one or more public keys (PK), a public key identifier (PKID) corresponding to each public key, and an identifier (certificate issuer ID) and digital signature of a certificate issuer (CI) which has issued a corresponding certificate.

In addition, a certificate issuer may be named as a certification issuer, a certificate authority (CA), a certification authority, or the like.

In the disclosure, a public key (PK) and a public key ID (PKID) may be used interchangeably with the same meaning as a certificate including a specific public key or a corresponding public key, a part of a specific public key and/or a part of a certificate including a corresponding public key, an operation result (e.g., Hash) value of a specific public key and/or an operation result (e.g., Hash) value of a certificate including a corresponding public key, an operation result (e.g., Hash) value of a part of a specific public key and/or an operation result (e.g., Hash) value of a part of a certificate including a corresponding public key, or a storage space in which data is stored.

In the disclosure, when certificates (primary certificates) issued by one certificate issuer are used to issue another certificate (secondary certificate) or secondary certificates are used to issue tertiary or higher certificates in conjunction, the correlation between the certificates may be named as a certificate chain or certificate hierarchy. In this case, a CI certificate used to issue the initial certificate may be named as the root of a certificate, the highest certificate, a root CI, a root CI certificate, a root CA, a root CA certificate, or the like.

In the disclosure, a communication service provider (mobile operator) may indicate a business entity that provides a communication service to a terminal, and may be collectively referred to all of a business supporting system (BSS), an operational supporting system (OSS), a point of sale (POS) terminal, and other IT systems of the mobile operator. In addition, in the disclosure, the mobile operator is not limited to expressing only a specific business entity that provides a communication service, and the mobile operator may be used as a term referring to a group or association (or consortium) of one or more business entities and/or a representative representing the corresponding group or association. In addition, in the disclosure, the mobile operator may be named as an operator (or OP or Op.), a mobile network operator (MNO), a service provider (SP), a profile owner (PO), or the like, and each mobile operator may configure or be assigned at least one name and/or unique identifier (object identifier: OID) of the mobile operator. When the mobile operator refers to a group or association or representative of one or more business entities, a name or unique identifier of a certain group or association or representative may be a name or unique identifier shared by all business entities affiliated with the corresponding group or association and/or all business entities cooperating with the corresponding representative.

In the disclosure, AKA may indicate authentication and key agreement, and may indicate an authentication algorithm for accessing 3GPP and 3GPP2 networks.

In the disclosure, K is an encryption key value stored in an eUICC used for the AKA authentication algorithm.

In the disclosure, OPc is a parameter value which may be stored in the eUICC used for the AKA authentication algorithm.

In the disclosure, NAA is a network access application program, and may be an application program, such as a USIM or an ISIM stored in a UICC to access a network. The NAA may be a network access module.

In the disclosure, an indicator may be used for expressing that a certain function, configuration, or operation is necessary or not necessary, or may also be used for expressing the corresponding function, configuration, or operation itself. In addition, in the disclosure, an indicator may be expressed in various forms, such as a character string or an alphanumeric string, an operator indicative of true/false (Boolean—TRUE or FALSE), a bitmap, and an array. Other expressions having the same meaning may be interchangeably used.

In addition, in describing the disclosure, when it is determined that a detailed description of a related known function or configuration may unnecessarily obscure the subject matter of the disclosure, the detailed description thereof will be omitted.

FIG. 1 illustrates a method in which a terminal connects to a mobile communication network by using a UICC having a fixed profile mounted thereon according to various embodiments.

As shown in FIG. 1, a UICC 120 may be inserted into a terminal 110. For example, the UICC 120 may be detachable or may be pre-built in the terminal.

A fixed profile of the UICC equipped with the fixed profile means that "access information" for accessing a specific mobile carrier is fixed. For example, the access information may be an IMSI which is a subscriber delimiter and a K or Ki value required to be authenticated to a network together with the subscriber delimiter.

The terminal 110 according to various embodiments may perform authentication with an authentication processing system (e.g., a home location register (HLR) or an authentication center (AuC)) of a mobile carrier by using the UICC 120. For example, the authentication process may be an authentication and key agreement (AKA) process. When the authentication is successful, the terminal may use a mobile communication service, such as a phone call or use of mobile data, by using a mobile carrier network 130 of a mobile communication system.

Figure 2:
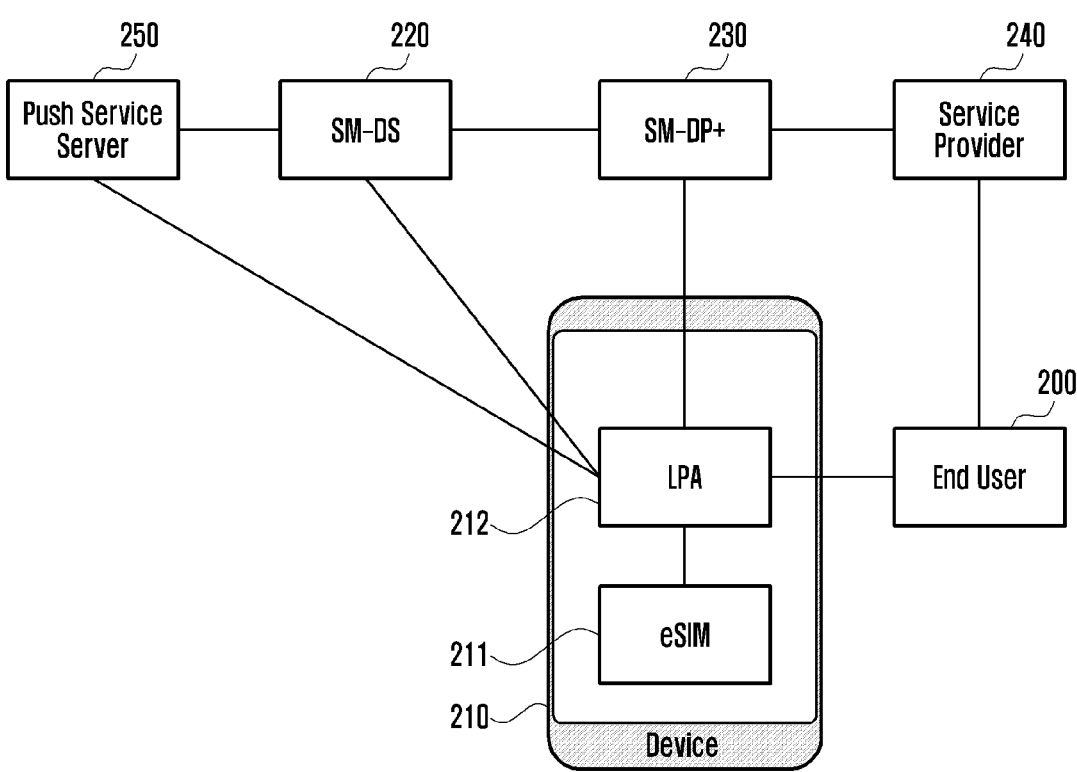
FIG. 2 illustrates an example of a connection of a termi- nal, a subscription relay server, a profile providing server, a service provider, and an event registration notification server (a notification server or a push service server) according to various embodiments of the disclosure.

FIG. 2 illustrates an example of a connection of a terminal, a subscription relay server, a profile providing server, a service provider, and an event registration notification server (a push service server) according to various embodiments.

As shown in FIG. 2, an eSIM 211 may be mounted in a terminal 210, and a profile (not shown) may be installed in the eSIM 211. In addition, an LPA 212 may be installed in the terminal 210. The eSIM 211 may be controlled by the LPA 212. A user 200 may install a profile in the eSIM 211 of each terminal or control the installed profile through the LPA 212. In addition, a push client (not shown) may be installed in the terminal 210, and may be connected to the LPA 212.

The user 200 may be provided with a communication service from a service provider (hereinafter, "mobile operator" or "business operator" 240). To this end, a profile (not shown) of the service provider 240 may be installed in the terminal 210.

The service provider 240 may be connected to a profile server 230, and the LPA 212 of the terminal 210 may be connected to the profile server 230 and a subscription relay server 220.

An event registration notification server (push service server) 250 may be connected to the subscription relay server 220, the LPA 212 of the terminal 210, or a push client (not shown).

FIG. 2 illustrates a case in which each of the profile server 230, the subscription relay server 220, and the push service server 250 is configured as a single server for convenience. However, according to an implementation and an embodiment, one or more profile servers (SM-DP+) may be included in a server configuration, one or more subscription relay servers (SM-DS) assisting a connection establishment between a specific profile server and the terminal may be included in the server configuration, and one or more event registration notification servers may be included. It is to be noted that various server configurations may be briefly indicated as a single profile server in the following drawings.

Detailed operations and message exchange procedures of the user 200, the service provider 240, the terminal 210, the eSIM 211, the LPA 212, the profile server 230, the subscription relay server 220, and the event registration notification server 250 according to an embodiment of the disclosure are described in detail with reference to drawings to be described later.

An address (e.g., FQDN, IP Address, or URL) of the subscription relay server 220 may be stored in the terminal 210 and/or the LPA 212 or the eSIM 211.

As shown in FIG. 2, the subscription relay server 220 may be connected to the profile server 230. For example, the profile server 230 may generate a specific event and register the generation of the event in the subscription relay server 220. Information provided by the profile server 230 to the subscription relay server 220 to register the event generation may include at least one of the following:

a forwarding indicator an address (FQDN, or Fully Qualified Domain Name) of the profile providing server a unique object identifier (Object ID or OID) of the profile providing server an IP address of the profile providing server an event identifier (EventID or MatchingID) generated in the profile providing server an eSIM identifier (hereafter, eUICC identifier or EID) targeted by an event generated in the profile providing server an identifier (PushServiceSupport) of whether to allow use of an event registration notification function for the corresponding event a type (ListOfPushServices) of event registration notification service to be used upon an event registration notification As shown in FIG. 2, the push service server 250 may be connected to the subscription relay server 220, the LPA 212, or the push client (not shown). For example, the LPA 212 or the push client (not shown) of the terminal may determine an information providing identifier and/or a push token (Push Token) which is an identifier which specifies the terminal 210 and the LPA 212 to receive a push notification in conjunction with the push service server 250, and register the same in the push service server 250. The LPA 212 or the push client (not shown) of the terminal may store the push token and/or the information providing identifier together with information including an address of the subscription relay server 220. In various embodiments of the disclosure, the push token and the information providing identifier may be used interchangeably with the same meaning.

In addition, the LPA 212 may transmit the push token to the subscription relay server 220 together with an eUICC identifier or an EID of the eSIM 211. The subscription relay server 220 may store the transmitted push token together with the eUICC identifier or the EID, and when an event corresponding to the corresponding eUICC identifier or EID is registered in the future, transmit the push token to the push service server 250. The push service server 250 may transmit a push notification to the push client (not shown) or the LPA 212 of the terminal 210, based on information of the terminal 210 corresponding to the push token. The push notification may be transmitted to the LPA 212 via the push client.

The LPA 212 having received the push notification may determine the subscription relay server 220 connected to the corresponding push token, and transmit a request for acquiring an event to the corresponding subscription relay server 220.

Detailed operations and message exchange procedures between the user 200, the terminal 210, the eSIM 211, the LPA 212, the subscription relay server 220, the profile server 230, and the service provider 240 according to various embodiments will be described in detail later.

Figure 3:
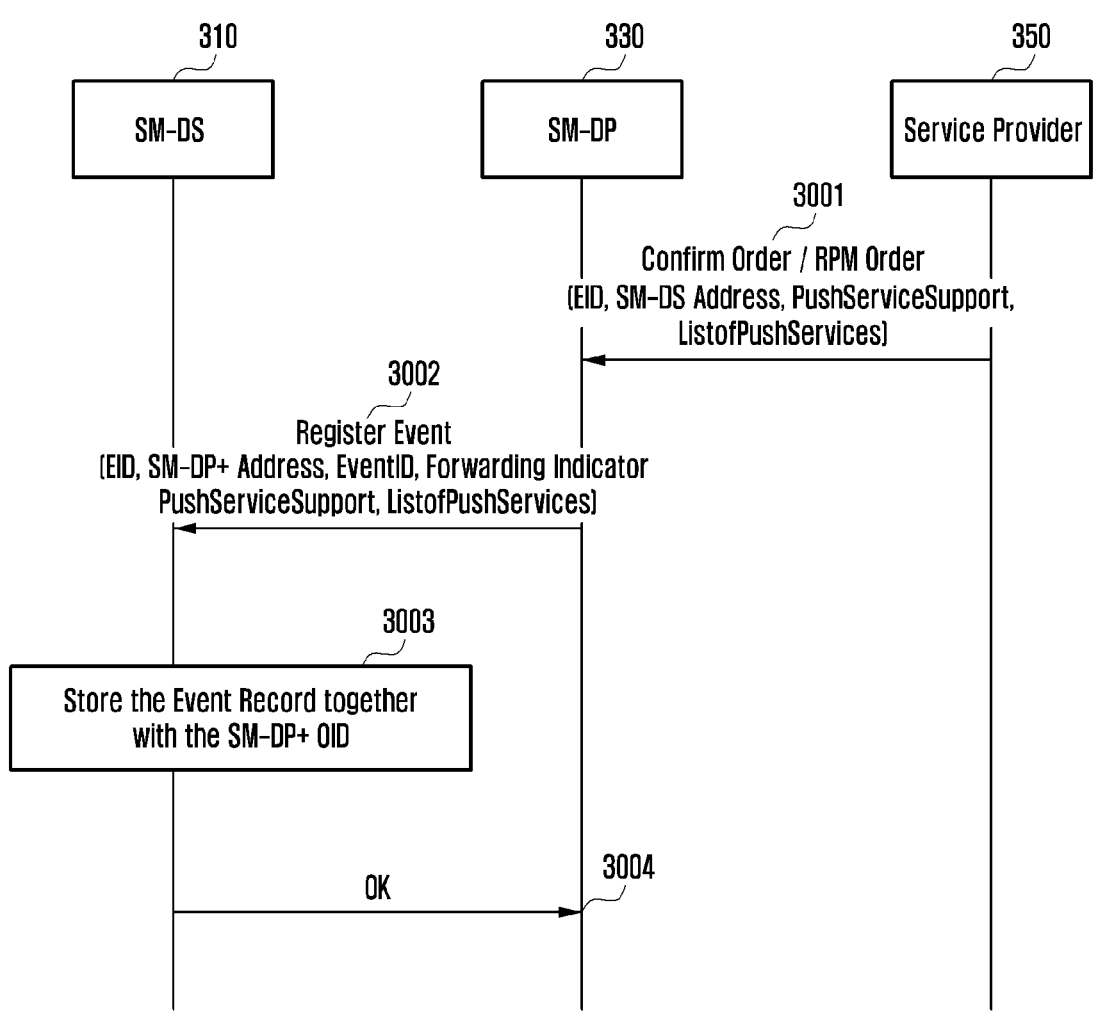
FIG. 3 illustrates an example of a message exchange procedure in which a profile providing server registers event generation in a subscription relay server according to vari- ous embodiments of the disclosure.

FIG. 3 illustrates an example of a message exchange procedure in which a profile providing server registers event generation in a subscription relay server according to various embodiments.

As shown in e, in operation 3001, a service provider 350 may instruct a profile providing server (e.g., SM-DP) 330 to generate an event corresponding to at least one of remote management commands of a profile for download or a profile installed in a terminal. In this case, the service provider 350 may selectively include at least one of the following information in the event generation command:

an identifier (eUICC ID or EID) of an eUICC in a terminal (not shown) targeted by an event an address of at least one subscription relay server (SM-DS Address) to register information of an event generated in the subscription relay server an identifier (PushServiceSupport) of whether the subscription relay server allows use of an event registration notification function for the corresponding event a type (ListOfPushServices) of event registration notification service that the subscription relay server can support for the corresponding event In operation 3001, the profile providing server 330 may generate an event according to a request of the service provider 350.

In operation 3002, the event generated by the profile providing server 330 may be registered in a subscription relay server (e.g., SM-DS) 310. For example, the event registration operation in operation 3002 may include an operation of transmitting, to the subscription relay server 310, an event registration request message (Register Event Request) selectively including at least one of the following information:

an event identifier (EventID or MatchingID)

an identifier (eUICC ID or EID) of an eUICC in a terminal (not shown)

an address (SM-DP+ Address) of at least one profile providing server 330 a forwarding indicator configured to be "False"

an identifier (PushServiceSupport) of whether to allow use of an event registration notification function an event registration notification service type (ListOfPushServices)

In operation 3003, the subscription relay server 310 may register the event requested by the profile providing server 330. The subscription relay server 310 may store at least one of the event identifier, the profile providing server address, a unique object identifier (Object ID or OID) of the profile providing server, the identifier of whether to allow use of an event registration notification function, or the event registration notification service type provided in operation 3002.

In operation 3004, the subscription relay server 310 may reply with an event registration response message (Register Event Response) to notify the profile providing server 330 of an event registration result.

Figure 4:
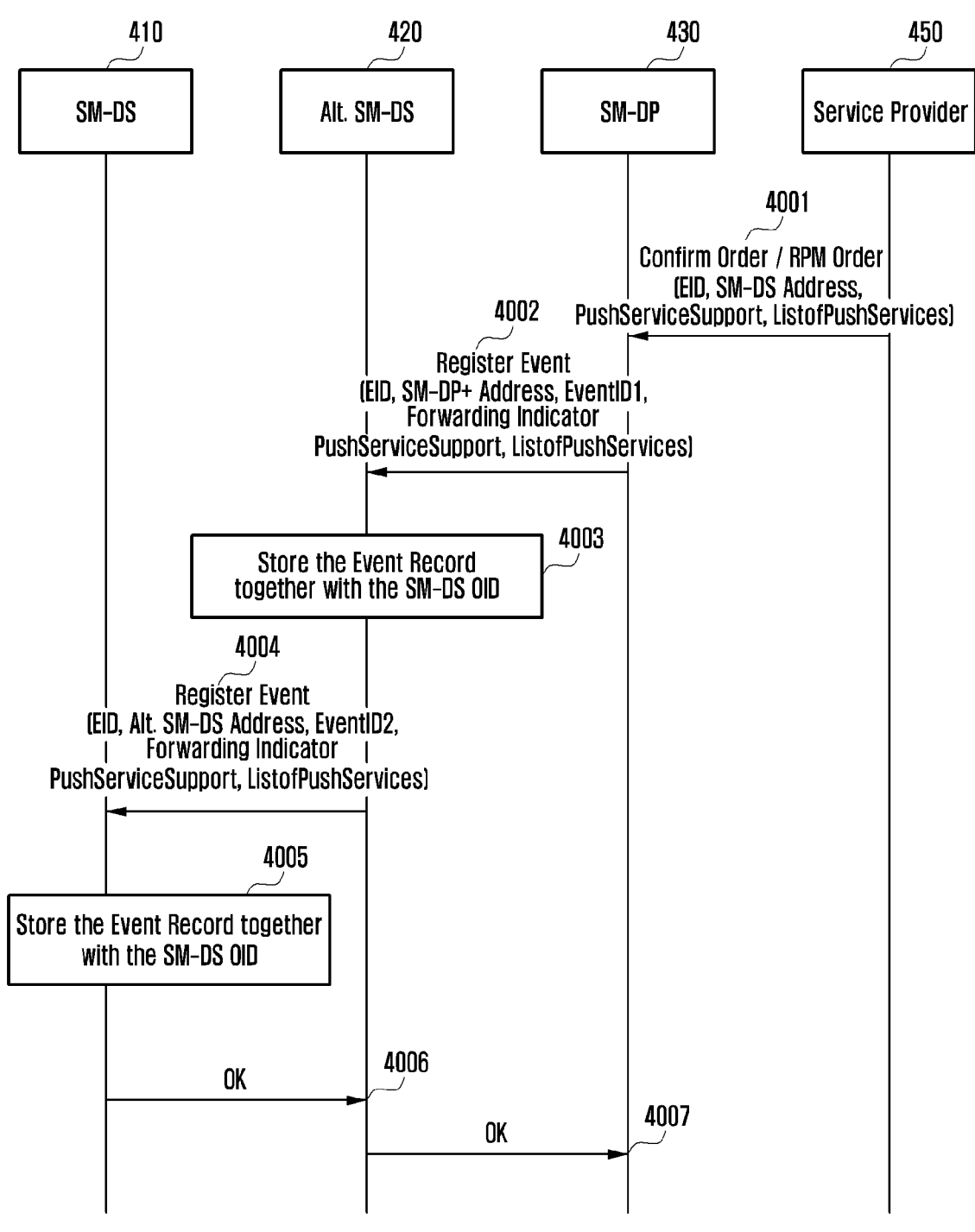
FIG. 4 illustrates an example of a message exchange procedure in which a profile providing server consecutively registers event generation in multiple subscription relay servers according to various embodiments of the disclosure.

FIG. 4 illustrates an example of a message exchange procedure in which a profile providing server consecutively registers event generation in multiple subscription relay servers according to various embodiments.

As shown in FIG. 4, in operation 4001, a service provider 450 may instruct a profile providing server (e.g., SM-DP) 430 to generate an event corresponding to at least one of remote management commands of a profile for download or a profile installed in a terminal. In this case, the service provider 450 may selectively include at least one of the following information in the event generation command:

an identifier (eUICC ID or EID) of an eUICC in a terminal (not shown) targeted by an event an address of at least one subscription relay server (SM-DS Address) to register information of an event generated in a subscription relay server an identifier (PushServiceSupport) of whether to allow use of an event registration notification function an event registration notification service type (ListOfPushServices)

In operation 4001, the profile providing server 430 may generate an event according to a request of the service provider 450.

In operation 4002, the event generated by the profile providing server 430 may be registered in an alternative subscription relay server (e.g., Alt. SM-DS) 420. For example, the event registration operation in operation 4002 may include an operation of transmitting, to the alternative subscription relay server 420, an event registration request message (Register Event Request) selectively including at least one of the following information:

- an event identifier (EventID1 or MatchingID)
- an identifier (eUICC ID or EID) of an eUICC in a terminal (not shown)
- an address (SM-DP+ Address) of at least one profile providing server 430
- a forwarding indicator configured to be "True"
- an identifier (PushServiceSupport) of whether to allow use of an event registration notification function
- an event registration notification service type (ListOfPushServices)

In operation 4003, the alternative subscription relay server 420 may register the event requested by the profile providing server 430. The alternative subscription relay server 420 may store at least one of the event identifier, the profile providing server address, a unique object identifier (Object ID or OID) of the profile providing server, the identifier of whether to allow use of an event registration notification function, or the event registration notification service type provided in operation 4002. In addition, in operation 4003, the alternative subscription relay server 420 may generate a new event identifier 2 (EventID2).

In operation 4004, the alternative subscription relay server 420 may register the generated event in a subscription relay server (e.g., SM-DS) 410. For example, the event registration operation in operation 4004 may include an operation of transmitting, to the subscription relay server 410, an event registration request message (Register Event Request) selectively including at least one of the following information:

- an event identifier (EventID2)
- an identifier (eUICC ID or EID) of an eUICC in a terminal (not shown)
- an address (SM-DP+ Address) of at least one profile providing server 430
- a forwarding indicator configured to be "False"
- an identifier (PushServiceSupport) of whether to allow use of an event registration notification function
- an event registration notification service type (ListOfPushServices)

In operation 4005, the subscription relay server 410 may register the event requested by the alternative subscription relay server 420. The subscription relay server 420 may store at least one of the event identifier 2, an alternative subscription relay server address, a unique object identifier (Object ID or OID) of the alternative subscription relay server, the identifier of whether to allow use of an event registration notification function, or the event registration notification service type provided in operation 4004.

In operation 4006, the subscription relay server 410 may reply with an event registration response message (Register Event Response) to notify the alternative subscription relay serve 420 of an event registration result. In addition, after receiving the response message, in operation 4007, the alternative subscription relay server 420 may reply with the event registration response message (Register Event Response) to notify the profile providing server 430.

Figure 5:
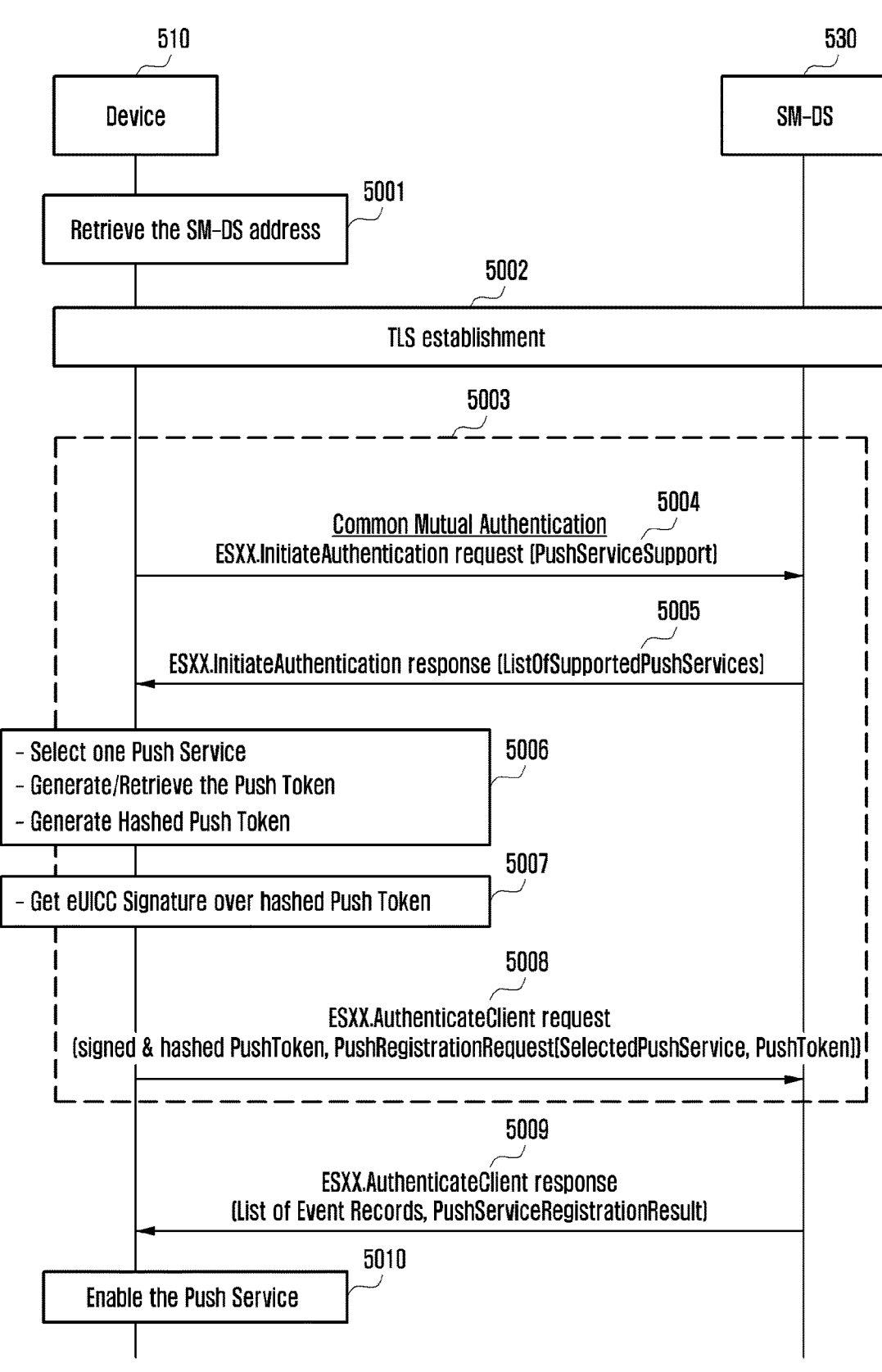
FIG. 5 illustrates an example of a message exchange procedure of an operation of registering an event registration notification identifier for use of an event registration noti- fication function by a terminal and a subscription relay server during a mutual authentication process according to various embodiments of the disclosure.

FIG. 5 illustrates an example of a message exchange procedure of an operation of registering an event registration notification identifier for use of an event registration notification function by a terminal and a subscription relay server during a mutual authentication process according to various embodiments.

In the embodiment of FIG. 5, a terminal 510 may be used interchangeably with an LPA (not shown) or an eSIM (not shown). In addition, an event registration notification identifier and a push token may be used interchangeably with each other.

In operation 5001, the LPA (not shown) of the terminal 510 may acquire information of at least one subscription relay server (e.g., SM-DS) 530 stored in the eSIM (not shown) or the LPA (not shown) in the terminal 510. For example, operation 5001 may be performed according to initial booting of the terminal, rebooting, a profile installation command input by a user, performing of profile remote management command identification by the user, a time point when an event registration notification function is required to be registered, or a time point when an identifier to identify information for the event registration notification function is required to be registered. In operation 5001, the information of the subscription relay server may selectively include at least one of the following:

- an address of at least one subscription relay server
- an event registration notification identifier The event registration notification identifier may be stored together with a validity period and an effective date, and may not be valid when the period has expired. In addition, the available number of uses of the event registration notification identifier may be designated, and the event registration notification identifier may not be valid when the number of uses is exceeded.

When the terminal 510 supports the event registration notification function and has acquired the address of the at least one subscription relay server 530 in operation 5001, the LPA of the terminal 510 may establish a transport layer security (TLS) connection with the subscription relay server 530 in operation 5002.

In operation 5003, the terminal 510 may perform a mutual authentication process with the subscription relay server 530. In this case, the mutual authentication may be a certificate-based mutual authentication in which an eSIM (or eUICC) of the terminal 510 and the subscription relay server authenticate each other by using an asymmetric key configured by a pair including a public key (PK) and a secret key (SK). The mutual authentication process may include operations 5004, 5005, 5006, 5007, 5008, and/or 5009.

The terminal 510 may selectively transmit at least one value among the following values to the subscription relay server 530 in operation 5004. For example, at least one value among the following values may be included in a mutual authentication start (InitiateAuthentication) request of the terminal 510 and transmitted:

- an event registration notification function support identifier (PushServiceSupport) of the terminal 510
- a random number value (euiccChallenge) generated by the eSIM mounted in the terminal 510
- information of the eSIM (euiccInfo or euiccInfo1) mounted in the terminal 510
- RSP function information supported by the LPA (not shown) installed in the terminal 510
- an address of the subscription relay server 530

The event registration notification function support identifier (PushServiceSupport) may be included in at least one of the information of the eSIM (euiccInfo or euiccInfo1) mounted in the terminal 510 or the RSP function information supported by the LPA (not shown) installed in the terminal

510, or may be independently included in a mutual authentication start request message.

In operation 5005, if the subscription relay server 530 supports the event registration notification function, the subscription relay server 530 may selectively transmit, to the terminal 510, at least one of a list (ListOfSupportedPush-Services) of event registration notification services supported by itself or an event registration notification function support identifier (PushServiceSupport) of the subscription relay server 530. For example, at least one of the list of the event registration notification services or the event registration notification function support identifier may be included in a response of mutual authentication start (InitiateAuthentication) and sent to the terminal 510. The list of the event registration notification services supported by the subscription relay server may be transmitted only when the terminal transmits the event registration notification function support identifier in operation 5004. In addition, the subscription relay server 530 may include, in the response, a session identifier (TransactionID) capable of identifying a mutual authentication session currently in progress between the terminal 510 and the subscription relay server 530.

In operation 5006, the terminal 510 may identify a reply of the subscription relay server 530. When, in the reply of operation 5005, verification of a signature or certificate of the subscription relay server 530 fails, an event is identified to not exist, or an error is identified, the terminal 510 may end the process.

In operation 5006, when the subscription relay server 530 replies with the list (ListOfSupportedPushServices) of the event registration notification services, the terminal 510 may select at least one event registration notification service, which is also supported by the terminal 510 itself, from the list (ListOfSupportedPushServices) of the event registration notification services supported by the subscription relay server 530. When the event registration notification service, which is also supported by the terminal 510 itself, cannot be found in the reply of operation 5005, the terminal 510 may end the process.

In addition, when the subscription relay server 530 replies with an event registration notification function support identifier (PushServiceSupport) in operation 5006, the terminal 510 may select at least one of the event registration notification cation services supported by itself. When the subscription relay server 530 does not reply with the event registration notification function support identifier, the terminal 510 may selectively end the process.

In operation 5006, when an event registration notification service previously registered in the subscription relay server 530 exists, the terminal 510 may determine to cancel the corresponding event registration notification service.

In operation 5006, the terminal 510 may determine an event registration notification identifier (Push Token) to be used for the event registration notification service. The corresponding process may be determined by the interaction between an event registration notification server (not shown) and a push client (not shown) of the terminal, and may be performed before or together with this operation. In addition, the terminal 510 or the LPA (not shown) of the terminal 510 may connect and store the event registration notification identifier and the address of the subscription relay server 530.

In operation 5006, the terminal 510 may selectively generate a hash value of the determined event registration notification identifier. The hash value may be generated using an algorithm such as secure hash algorithm (SHA)-0, SHA-1, or SHA-256. In addition, the hash value of the event registration notification identifier generated by the terminal may selectively include at least one of the following values:

an event registration notification identifier a session identifier (TransactionID)

a selected event registration notification service (Select-
      edPushService)

a previously registered event registration notification ser-
      vice cancellation request (DisablePushService)

The previously registered event registration notification service cancellation request (DisablePushService) may be included in the selected event registration notification service (SelectedPushService).

In operation 5007, the terminal 510 may selectively generate a digital signature of an eSIM (not shown) mounted in the terminal 510 such that at least one of the event registration notification identifier, the session identifier, the selected event registration notification service, the previously registered event registration notification service cancellation request, or the hash value of the event registration notification identifier is included. Before generating the corresponding digital signature, the eSIM may authenticate the subscription relay server 530.

In operation 5008, the terminal 510 may transmit a request for registration of an event registration notification identifier so that an event registration notification is made when an event related to the eSIM mounted in the terminal 510 is registered in the subscription relay server 530. The corresponding request may selectively include at least one of the following information. For example, at least one of the following information may be included in a client authentication (AuthenticateClient) request and transmitted:

an eUICC identifier (EID)

an event identifier (EventID or MatchingID)

an event registration notification function support identi-
      fier of the terminal 510 an event registration notification identifier a validity period, effective date, and number of uses of the
      event registration notification identifier an event registration notification identifier hash value a selected event registration notification service a previously registered event registration notification ser-
      vice cancellation request a session identifier (TransactionID)

an eUICC signature generated by an eUICC's secret key an eUICC certificate and higher-level certificate a signature verification function support identifier of the
      subscription relay server The previously registered event registration notification service cancellation request (DisablePushService) may be included in the selected event registration notification service (SelectedPushService).

In operation 5008, the subscription relay server 530 may authenticate the eUICC by verifying the eUICC identifier, the eUICC signature, and the eUICC certificate.

In operation 5008, the subscription relay server 530 may selectively generate an event registration notification identifier hash value such that at least one of the transmitted event registration notification identifier, the session identifier, and the selected event registration notification service is included. In addition, the subscription relay server 530 may compare the hash value generated by itself and the event registration notification identifier hash value transmitted by the terminal.

In operation 5008, the subscription relay server 530 may connect and store the event registration notification identifier transmitted from the terminal 510 and the eUICC identifier (EID) of the terminal 510. This may be selectively performed when the hash value generated by the subscription relay server 530 is compared with the event registration notification identifier hash value transmitted by the terminal and the values are the same.

In operation 5008, the subscription relay server 530 may configure and store at least one of an effective date, a validity period, or the available number of uses of the event registration notification identifier. In addition, the event registration notification identifier may not be valid due to the expiration of the period or exceeding the number of uses. In addition, the subscription relay server 530 may store a time point when the terminal 510 is required to directly access the subscription relay server 530 in addition to the event registration notification function.

In operation 5008, when the terminal 510 transmits the previously registered event registration notification service cancellation request, the subscription relay server 530 may cancel the previously registered event registration notification service.

In operation 5008, the subscription relay server 530 may selectively retrieve a registered event corresponding to the event identifier and the eUICC identifier (EID) or the requested eUICC identifier (EID).

In operation 5009, the subscription relay server 530 may reply with a response message to the terminal. In this case, the response message may selectively include at least one of the following. For example, at least one of the following may be included in a client authentication (AuthenticateClient) response and transmitted:

an event list: an event identifier (Event ID or Matching ID), an RSP server address, and an event list may be empty
   an event registration notification service registration result
   an event registration notification service registration cancellation result
   an event registration notification identifier
   an event registration notification identifier validity condition (a period, number of uses, etc.)
   a time point of directly connecting to the subscription relay server in addition to an event registration notification In operation 5003 (operation 5004 or operation 5008), when the terminal 510 transmits that a signature of the subscription relay server 530 can be verified via the signature verification function support identifier of the subscription relay server, the subscription relay server 530 may sign a part or all of the information by using a secret key of the subscription relay server 530.

In operation 5010, when the signature of the subscription relay server 530 is included in a reply value of the subscription relay server 530, the terminal 510 may verify the signature. When the verification fails, the terminal 510 may stop the process and display an error to a user (not shown).

In operation 5010, the terminal 510 may store, in the terminal 510, the currently-replied event registration notification identifier and address of the subscription relay server 530. In this case, the replied information may be stored in the LPA (not shown) installed in the terminal 510 or the eSIM (or eUICC) (not shown) mounted in the terminal 510.

Figure 6:
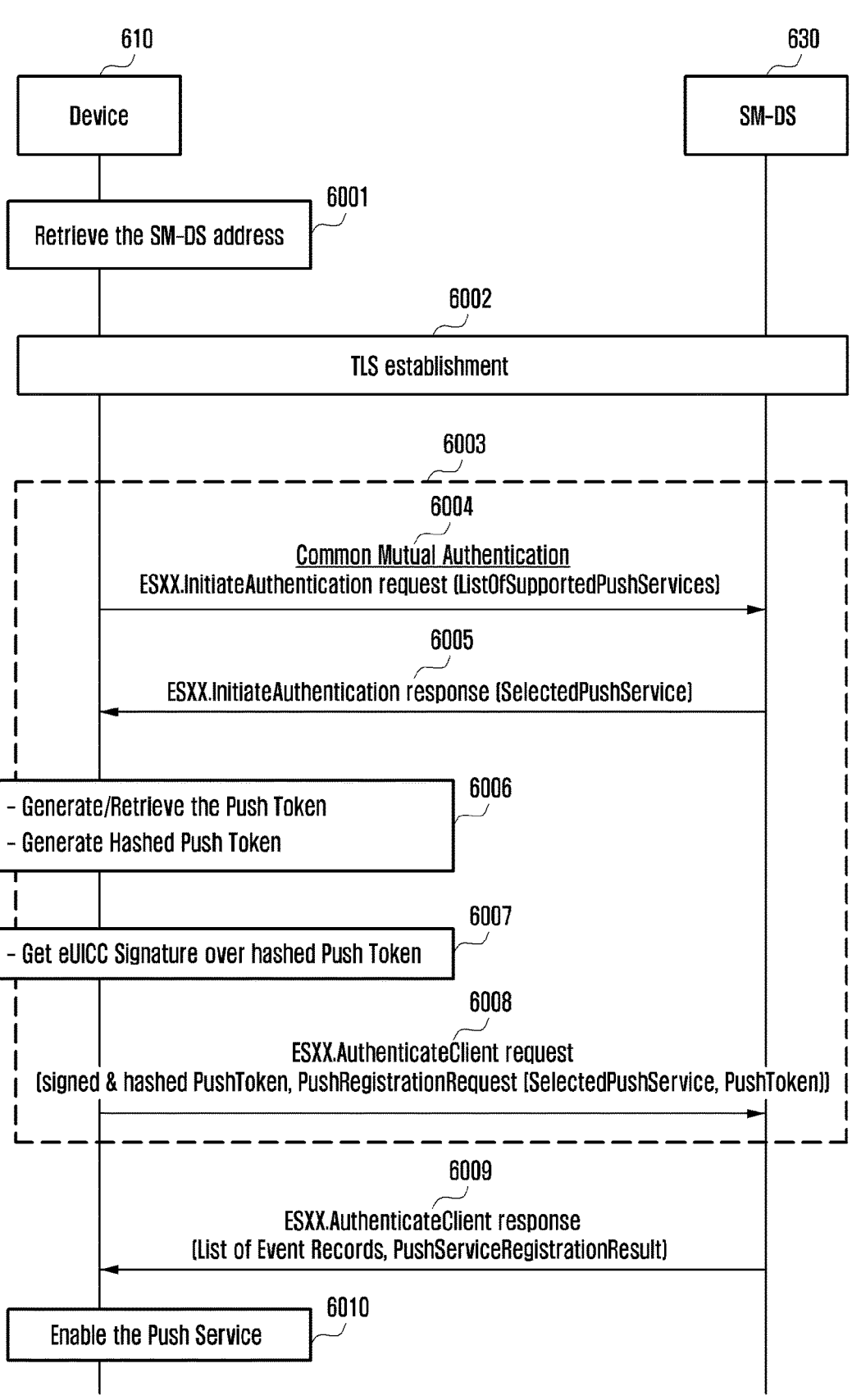
FIG. 6 illustrates an example of a message exchange procedure of an operation of registering an event registration notification identifier for use of an event registration noti- fication function by a terminal and a subscription relay server during a mutual authentication process according to various embodiments of the disclosure.

FIG. 6 illustrates an example of a message exchange procedure of an operation of registering an event registration notification identifier for use of an event registration notification function by a terminal and a subscription relay server during a mutual authentication process according to various embodiments.

In the embodiment of FIG. 6, a terminal 610 may be used interchangeably with an LPA (not shown) or an eSIM (not shown). In addition, an event registration notification identifier and a push token may be used interchangeably with each other.

In operation 6001, the LPA (not shown) of the terminal 610 may acquire information of at least one subscription relay server (e.g., SM-DS) 630 stored in the eSIM (not shown) or the LPA (not shown) in the terminal 610. For example, operation 6001 may be performed according to initial booting of the terminal, rebooting, a profile installation command input by a user, performing of profile remote management command identification by the user, a time point when an event registration notification function is required to be registered, or a time point when an identifier to identify information for the event registration notification function is required to be registered. In operation 6001, the information of the subscription relay server may selectively include at least one of the following:

an address of at least one subscription relay server
   an event registration notification identifier The event registration notification identifier may be stored together with a validity period and an effective date, and may not be valid when the period has expired. In addition, the available number of uses of the event registration notification identifier may be designated, and the event registration notification identifier may not be valid when the number of uses is exceeded.

When the terminal 610 supports an event registration notification function and has acquired the address of the at least one subscription relay server 630 in operation 6001, the LPA of the terminal 610 may establish a TLS connection with the subscription relay server 630 in operation 6002.

In operation 6003, the terminal 610 may perform a mutual authentication process with the subscription relay server 630. In this case, the mutual authentication may be a certificate-based mutual authentication in which an eSIM (or eUICC) of the terminal 610 and the subscription relay server authenticate each other by using an asymmetric key configured by a pair including a public key (PK) and a secret key (SK). The mutual authentication process may include operations 6004, 6005, 6006, 6007, 6008, and/or 6009.

The terminal 610 may selectively include at least one value among the following values in the subscription relay server 630 in operation 6004. For example, at least one value among the following values may be included in a mutual authentication start (InitiateAuthentication) request of the terminal 610 and transmitted:

a list (ListOfSupportedPushServices) of event registration notification services supported by the terminal 610
   an event registration notification function support identifier (PushServiceSupport) of the terminal 610
   a random number value (euiccChallenge) generated by the eSIM mounted in the terminal 610
   information of the eSIM (euiccInfo or euiccInfo1) mounted in the terminal 610
   RSP function information supported by the LPA (not shown) installed in the terminal 610
   an address of the subscription relay server 630

The list (ListOfSupportedPushServices) of the supported event registration notification services may be empty, and the list (ListOfSupportedPushServices) of the supported event registration notification services or the event registration notification function support identifier (PushServiceSupport) may be included in at least one of the information of the eSIM (euiccInfo or euiccInfo1) mounted in the terminal 610 or the RSP function information supported by the LPA (not shown) installed in the terminal 610, or may be independently included in a mutual authentication start request message.

When the terminal 610 transmits the list (ListOfSupportedPushServices) of the event registration notification services in operation 6004, in operation 6005, the subscription relay server 630 may select at least one event registration notification service, which is also supported by the subscription relay server 630 itself, from the list (ListOfSupportedPushServices) of the event registration notification services transmitted by the terminal 610, and may selectively reply with the selected event registration notification service (SelectedPushService) to the terminal 610. In addition, when the terminal 610 transmits the event registration notification function support identifier (PushServiceSupport), the subscription relay server 630 may select at least one of the event registration notification services supported by itself in operation 6005. In addition, the subscription relay server 630 may include, in a response, a session identifier (TransactionID) capable of identifying a mutual authentication session currently in progress between the terminal 610 and the subscription relay server 630. For example, at least one of information on the selected event registration notification service or the session identifier may be included in a response of mutual authentication start (InitiateAuthentication) and indicated to the terminal 610.

In operation 6006, the terminal 610 may identify a reply of the subscription relay server 630. When, in the reply of operation 6005, verification of a signature or certificate of the subscription relay server 630 fails, an event is identified to not exist, or an error is indicated, the terminal 610 may end the process.

In operation 6006, the terminal 610 may verify whether the terminal 610 also supports the selected event registration notification service (SelectedPushService) replied with by the subscription relay server 630. When the verification fails, the terminal 610 may end the process.

In operation 6006, when an event registration notification service previously registered in the subscription relay server 630 exists, the terminal 610 may determine to cancel the corresponding event registration notification service.

In operation 6006, the terminal 610 may determine an event registration notification identifier (Push Token) to be used for the selected common event registration notification service. The corresponding process may be determined by the interaction between an event registration notification server (not shown) and a push client (not shown) of the terminal, and may be performed before or together with this operation. In addition, the terminal 610 or the LPA (not shown) of the terminal 610 may connect and store the event registration notification identifier and the address of the subscription relay server 630.

In operation 6006, the terminal 610 may selectively generate a hash value of the determined event registration notification identifier. The hash value may be generated by using an algorithm such as secure hash algorithm (SHA)-0, SHA-1, or SHA-256. In addition, the hash value of the event registration notification identifier generated by the terminal may selectively include at least one of the following values:
  an event registration notification identifier
  a session identifier (TransactionID)
  a selected event registration notification service (SelectedPushService)
  a previously registered event registration notification service cancellation request (DisablePushService)

The previously registered event registration notification service cancellation request (DisablePushService) may be included in the selected event registration notification service (SelectedPushService).

In operation 6007, the terminal 610 may selectively generate a digital signature of the eSIM (not shown) mounted in the terminal 610 such that at least one of the event registration notification identifier, the session identifier, the selected event registration notification service, the previously registered event registration notification service cancellation request, or the hash value of the event registration notification identifier is included. Before generating the corresponding digital signature, the eSIM may authenticate the subscription relay server 630.

In operation 6008, the terminal 610 may transmit a request for registration of an event registration notification identifier so that an event registration notification is made when an event related to the eSIM mounted in the terminal 610 is registered in the subscription relay server 630. The corresponding request may selectively include at least one of the following information. For example, at least one of the following information may be included in a client authentication (AuthenticateClient) request and transmitted:
  an eUICC identifier (EID)
  an event identifier (EventID or MatchingID)
  an event registration notification function support identifier of the terminal 610
  an event registration notification identifier
  a validity period, effective date, and number of uses of the event registration notification identifier
  an event registration notification identifier hash value
  a selected event registration notification service
  a previously registered event registration notification service cancellation request
  a session identifier (TransactionID)
  an eUICC signature generated by an eUICC's secret key
  an eUICC certificate and higher-level certificate
  a signature verification function support identifier of the subscription relay server The previously registered event registration notification service cancellation request (DisablePushService) may be included in the selected event registration notification service (SelectedPushService).

In operation 6008, the subscription relay server 630 may authenticate the eUICC by verifying the eUICC identifier, the eUICC signature, and the eUICC certificate.

In operation 6008, the subscription relay server 630 may selectively generate an event registration notification identifier hash value such that at least one of the transmitted event registration notification identifier, the session identifier, and the selected event registration notification service is included. In addition, the subscription relay server 630 may compare the hash value generated by itself and the event registration notification identifier hash value transmitted by the terminal.

In operation 6008, the subscription relay server 630 may connect and store the event registration notification identifier transmitted by the terminal 610 and the eUICC identifier (EID) of the terminal 610. This may be selectively performed when the hash value generated by the subscription relay server 630 is compared with the event registration notification identifier hash value transmitted by the terminal and the values are the same.

In operation 6008, the subscription relay server 630 may configure and store at least one of an effective date, a validity period, and the available number of uses of the event registration notification identifier. In addition, the event registration notification identifier may not be valid due to the expiration of the period or exceeding the number of uses. In addition, the subscription relay server 630 may store a time point when the terminal 610 is required to directly access the subscription relay server 630 in addition to the event registration notification function.

In operation 6008, when the terminal 610 transmits the previously registered event registration notification service cancellation request, the subscription relay server 630 may cancel the previously registered event registration notification service.

In operation 6008, the subscription relay server 630 may selectively retrieve a registered event corresponding to the event identifier and the eUICC identifier (EID) or the requested eUICC identifier (EID).

In operation 6009, the subscription relay server 630 may reply with a response message. In this case, the response message may selectively include at least one of the following. For example, at least one of the following may be included in a client authentication (AuthenticateClient) response and transmitted:

an event list: an event identifier (Event ID or Matching ID), an RSP server address, and an event list may be empty.
  an event registration notification service registration result
  an event registration notification service registration cancellation result
  an event registration notification identifier
  an event registration notification identifier validity condition (a period, number of uses, etc.)
  a time point of directly connecting to the subscription relay server in addition to an event registration notification In operation 6003 (operation 6004 or operation 6008), when the terminal 610 transmits that a signature of the subscription relay server 630 can be verified via the signature verification function support identifier of the subscription relay server, the subscription relay server 630 may sign a part or all of the information by using a secret key of the subscription relay server 630.

In operation 6010, when the signature of the subscription relay server 630 is included in a reply value of the subscription relay server 630, the terminal 610 may verify the signature. When the verification fails, the terminal 610 may stop the process and display an error to a user (not shown).

In operation 6010, the terminal 610 may store, in the terminal 610, the currently-replied event registration notification identifier and address of the subscription relay server 630. In this case, the replied information may be stored in the LPA (not shown) installed in the terminal 610 or the eSIM (or eUICC) (not shown) mounted in the terminal 610.

Figure 7:
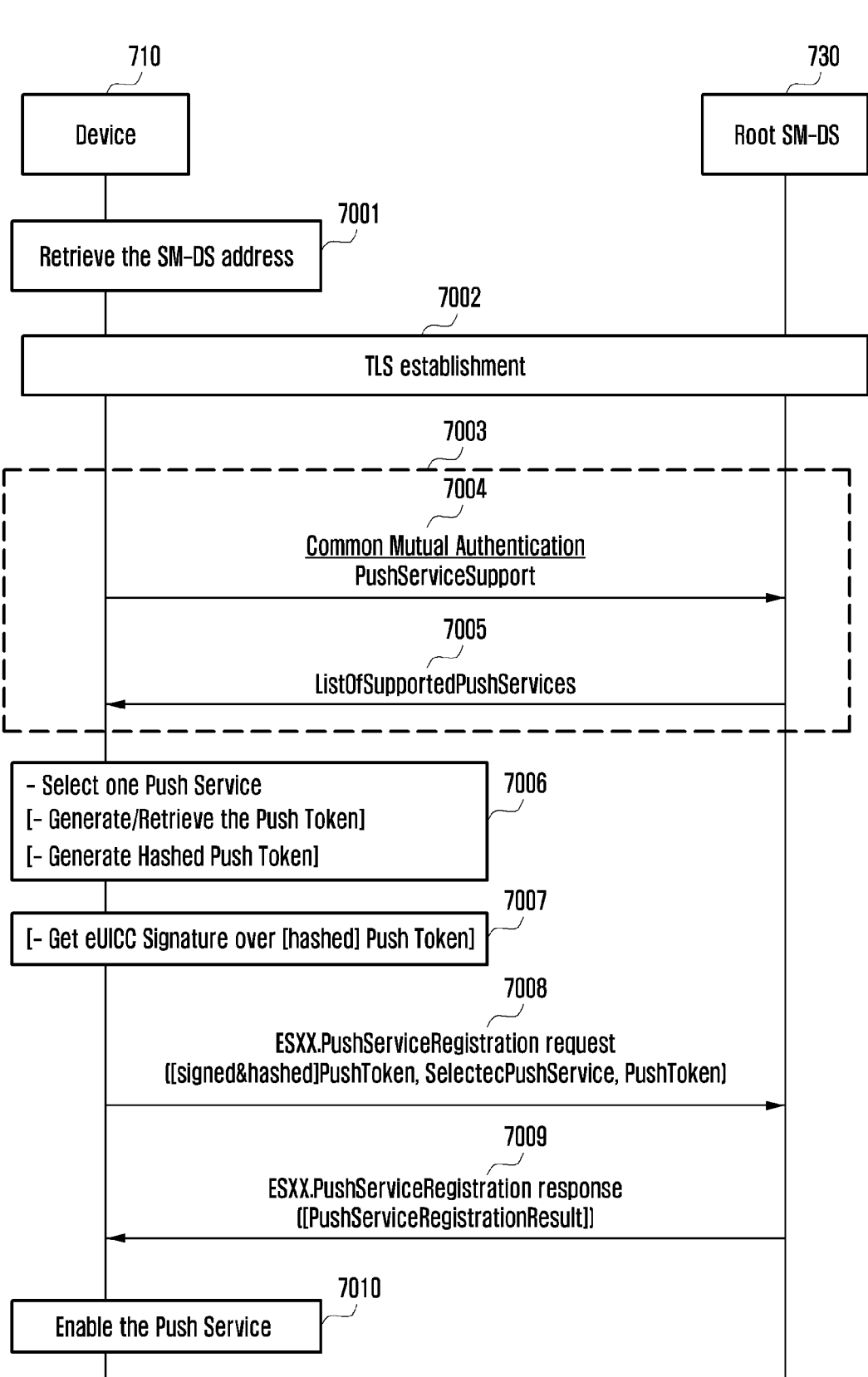
FIG. 7 illustrates an example of a message exchange procedure of an operation of registering an event registration notification identifier for use of an event registration noti- fication function by a terminal and a subscription relay server according to various embodiments of the disclosure.

FIG. 7 illustrates an example of a message exchange procedure of an operation of registering an event registration notification identifier for use of an event registration notification function by a terminal and a subscription relay server according to various embodiments of the disclosure.

In the embodiment of FIG. 7, a terminal 710 may be used interchangeably with an LPA (not shown) or an eSIM (not shown). In addition, an event registration notification identifier and a push token may be used interchangeably with each other.

In operation 7001, the LPA (not shown) of the terminal 710 may acquire information of at least one subscription relay server 730 stored in the eSIM (not shown) or the LPA (not shown) in the terminal 710. For example, operation 7001 may be performed according to initial booting of the terminal, rebooting, a profile installation command input by a user, performing of profile remote management command identification by the user, a time point when an event registration notification function is required to be registered, or a time point when an identifier to identify information for the event registration notification function is required to be registered. In operation 7001, the information of the subscription relay server may selectively include at least one of the following:

an address of at least one subscription relay server
  an event registration notification identifier The event registration notification identifier may be stored together with a validity period and an effective date, and may not be valid when the period has expired. In addition, the available number of uses of the event registration notification identifier may be designated, and the event registration notification identifier may not be valid when the number of uses is exceeded.

When the terminal 710 supports an event registration notification function and has acquired the address of the at least one subscription relay server 730 in operation 7001, the LPA of the terminal 710 may establish a TLS connection with the subscription relay server 730 in operation 7002.

In operation 7003, the terminal 710 may perform a mutual authentication process with the subscription relay server 730. In this case, the mutual authentication may be a certificate-based mutual authentication in which the eSIM (or eUICC) of the terminal 710 and the subscription relay server authenticate each other by using an asymmetric key configured by a pair including a public key (PK) and a secret key (SK). The mutual authentication process may include operations 7004 and/or 7005.

The terminal 710 may selectively transmit an event registration notification function support identifier (PushServiceSupport) to the subscription relay server 730 in operation 7004. The event registration notification function support identifier (PushServiceSupport) may be included in at least one of information of the eSIM (euiccInfo or euiccInfo1) mounted in the terminal 710 or RSP function information supported by the LPA (not shown) installed in the terminal 710, or may be independently included in a mutual authentication start request message.

In operation 7005, if the subscription relay server 730 supports the event registration notification function, the subscription relay server 730 may selectively reply with, to the terminal 710, at least one of a list (ListOfSupportedPushServices) of event registration notification services supported by itself or an event registration notification function support identifier (PushServiceSupport) of the subscription relay server 730. The list of the event registration notification services supported by the subscription relay server or the event registration notification function support identifier may be transmitted only when the terminal transmits the event registration notification function support identifier in operation 7004. In addition, the subscription relay server 730 may include, in a response, a session identifier (TransactionID) capable of identifying a mutual authentication session currently in progress between the terminal 710 and the subscription relay server 730.

In operation 7006, the terminal 710 may identify a reply of the subscription relay server 730. When, in the reply of operation 7005, verification of a signature or certificate of the subscription relay server 730 fails, an event is identified to not exist, or an error is indicated, the terminal 710 may end the process.

In operation 7006, when the subscription relay server 730 replies with the list (ListOfSupportedPushServices) of the supported event registration notification services, the terminal 710 may select at least one event registration notification service, which is also supported by the terminal 710 itself, from the list (ListOfSupportedPushServices) of the event registration notification services supported by the subscription relay server 730. When the event registration notification service, which is also supported by the terminal 710 itself, cannot be found in the reply of operation 7005, the terminal 710 may end the process.

In addition, when the subscription relay server 730 replies with an event registration notification function support identifier (PushServiceSupport) in operation 7006, the terminal 710 may select at least one of the event registration notification services supported by itself. When the subscription relay server 730 does not reply with the event registration notification function support identifier, the terminal 710 may selectively end the process.

In operation 7006, when an event registration notification service previously registered in the subscription relay server 730 exists, the terminal 710 may determine to cancel the corresponding event registration notification service.

In operation 7006, the terminal 710 may determine an event registration notification identifier (Push Token) to be used for the selected event registration notification service. The corresponding process may be determined by the interaction between an event registration notification server (not shown) and a push client (not shown) of the terminal, and may be performed before or together with this operation. In addition, the terminal 710 or the LPA (not shown) of the terminal 710 may connect and store the event registration notification identifier and the address of the subscription relay server 730.

In operation 7006, the terminal 710 may selectively generate a hash value of the determined event registration notification identifier. The hash value may be generated by using an algorithm such as secure hash algorithm (SHA)-0, SHA-1, or SHA-256. In addition, the hash value of the event registration notification identifier generated by the terminal may selectively include at least one of the following values:

an event registration notification identifier
a session identifier (TransactionID)
a selected event registration notification service (SelectedPushService)
a previously registered event registration notification service cancellation request (DisablePushService)

The previously registered event registration notification service cancellation request (DisablePushService) may be included in the selected event registration notification service (SelectedPushService).

In operation 7007, the terminal 710 may selectively generate a digital signature of the eSIM (not shown) mounted in the terminal 710 such that at least one of the event registration notification identifier or the hash value of the event registration notification identifier is included. Before generating the corresponding digital signature, the eSIM may authenticate the subscription relay server 730.

In operation 7008, the terminal 710 may transmit a request for registration of an event registration notification identifier so that an event registration notification is made when an event related to the eSIM mounted in the terminal 710 is registered in the subscription relay server 730. The corresponding request may selectively include at least one of the following information:

an event registration notification function support identifier of the terminal 710
an event registration notification identifier a validity period, effective date, and number of uses of the event registration notification identifier
an event registration notification identifier hash value
a selected event registration notification service
a previously registered event registration notification service cancellation request
a session identifier (TransactionID)
an eUICC signature generated by an eUICC's secret key
an eUICC certificate and higher-level certificate
a signature verification function support identifier of the subscription relay server The previously registered event registration notification service cancellation request (DisablePushService) may be included in the selected event registration notification service (SelectedPushService).

In operation 7008, the subscription relay server 730 may authenticate the eUICC by verifying an eUICC identifier, the eUICC signature, and the eUICC certificate.

In operation 7008, the subscription relay server 730 may generate an event registration notification identifier hash value such that at least one of the event registration notification identifier transmitted from the terminal 710, the session identifier, and the selected event registration notification service is included. In addition, the subscription relay server 730 may compare the hash value generated by itself and the event registration notification identifier hash value transmitted by the terminal.

In operation 7008, the subscription relay server 730 may connect and store the event registration notification identifier and an eUICC identifier (EID) of the terminal 710. This may be selectively performed when the hash value generated by the subscription relay server 730 is compared with the event registration notification identifier hash value transmitted by the terminal and the values are the same.

In operation 7008, the subscription relay server 730 may configure and store at least one of an effective date, a validity period, and the available number of uses of the event registration notification identifier. In addition, the event registration notification identifier may not be valid due to the expiration of the period or exceeding the number of uses. In addition, the subscription relay server 730 may store a time point when the terminal 710 is required to directly access the subscription relay server 730 in addition to the event registration notification function.

In operation 7008, when the terminal 710 transmits the previously registered event registration notification service cancellation request, the subscription relay server 730 may cancel the previously registered event registration notification service.

In operation 7009, the subscription relay server 730 may reply with a response message. In this case, the response message may selectively include at least one of the following:

an event registration notification service registration result
an event registration notification service registration cancellation result
an event registration notification identifier
an event registration notification identifier validity condition (a period, number of uses, etc.)
a time point of directly connecting to the subscription relay server in addition to an event registration notification In addition, the subscription relay server 730 may sign a part or all of the information by using a secret key of the subscription relay server 730.

In operation 7010, when the signature of the subscription relay server 730 is included in a reply value of the subscription relay server 730, the terminal 710 may verify the signature. When the verification fails, the terminal 710 may stop the process and display an error to a user (not shown).

In operation 7010, the terminal 710 may store, in the terminal 710, the currently-replied event registration notification identifier and address of the subscription relay server 730. In this case, the replied information may be stored in the LPA (not shown) installed in the terminal 710 or the eSIM (or eUICC) (not shown) mounted in the terminal 710.

Figure 8:
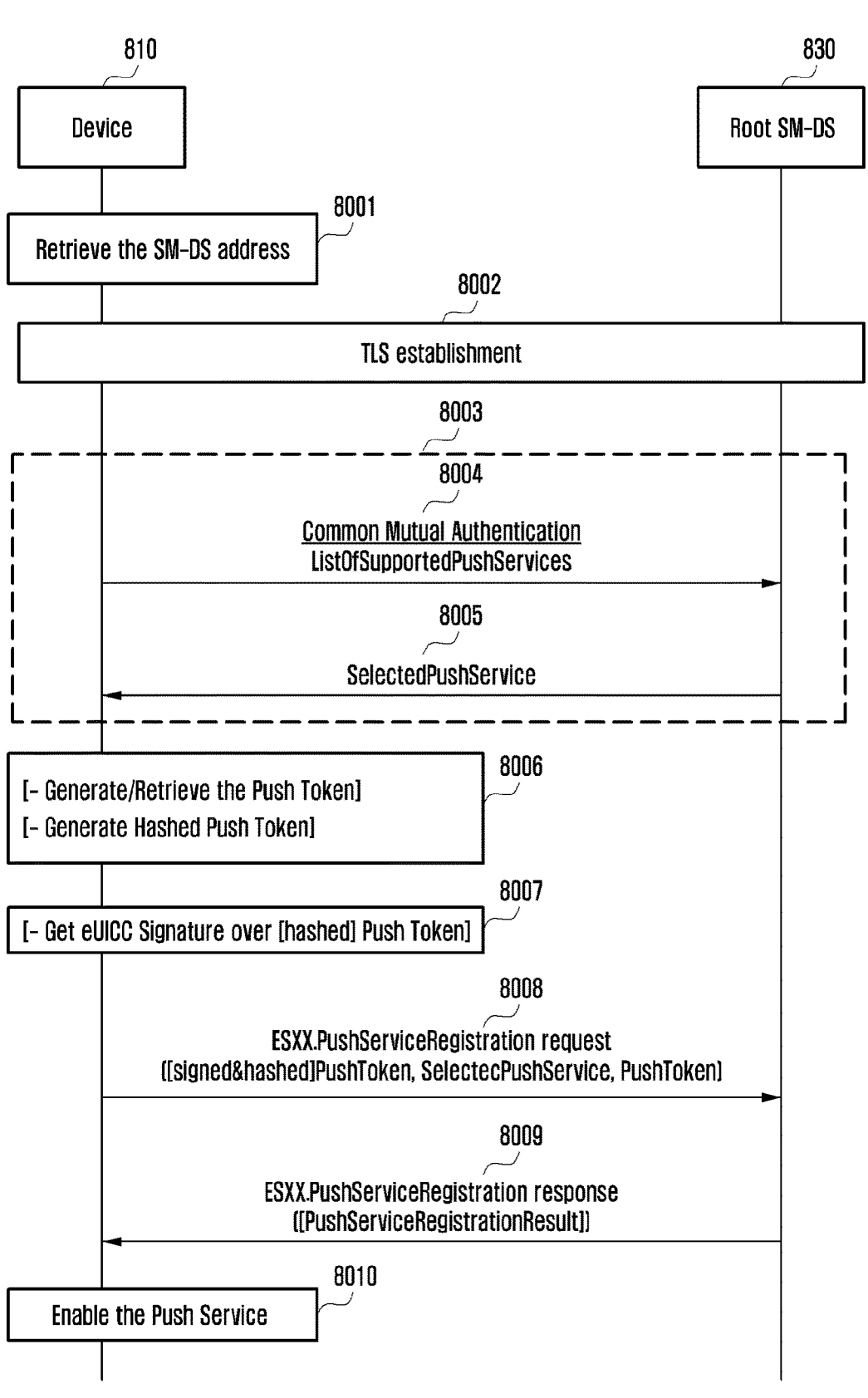
FIG. 8 illustrates an example of a message exchange procedure of an operation of registering an event registration notification identifier for use of an event registration noti- fication function by a terminal and a subscription relay server according to various embodiments of the disclosure.

FIG. 8 illustrates an example of a message exchange procedure of an operation of registering an event registration notification identifier for use of an event registration notification function by a terminal and a subscription relay server according to various embodiments.

In the embodiment of FIG. 8, a terminal 810 may be used interchangeably with an LPA (not shown) or an eSIM (not shown). In addition, an event registration notification identifier and a push token may be used interchangeably with each other.

In operation 8001, the LPA (not shown) of the terminal 810 may acquire information of at least one subscription relay server (e.g., SM-DS) 830 stored in the eSIM (not shown) or the LPA (not shown) in the terminal 810. For example, operation 8001 may be performed according to initial booting of the terminal, rebooting, a profile installation command input by a user, performing of profile remote management command identification by the user, a time point when an event registration notification function is required to be registered, or a time point when an identifier to identify information for the event registration notification function is required to be registered. In operation 8001, the information of the subscription relay server may selectively include at least one of the following:

an address of at least one subscription relay server an event registration notification identifier The event registration notification identifier may be stored together with a validity period and an effective date, and may not be valid when the period has expired. In addition, the available number of uses of the event registration notification identifier may be designated, and the event registration notification identifier may not be valid when the number of uses is exceeded.

When the terminal 810 supports an event registration notification function and has acquired the address of the at least one subscription relay server 830 in operation 8001, the LPA of the terminal 810 may establish a TLS connection with the subscription relay server 830 in operation 8002.

In operation 8003, the terminal 810 may perform a mutual authentication process with the subscription relay server 830. In this case, the mutual authentication may be a certificate-based mutual authentication in which the eSIM (or eUICC) of the terminal 810 and the subscription relay server authenticate each other by using an asymmetric key configured by a pair including a public key (PK) and a secret key (SK). The mutual authentication process may include operations 8004 and/or 8005.

The terminal 810 may selectively transmit a list (ListOfSupportedPushServices) of supported event registration notification services or an event registration notification function support identifier (PushServiceSupport) to the subscription relay server 830 in operation 8004. The list (ListOfSupportedPushServices) of the supported event registration notification services or the event registration notification function support identifier (PushServiceSupport) may be included in at least one of information of the eSIM (euiccInfo or euiccInfo1) mounted in the terminal 810 or RSP function information supported by the LPA (not shown) installed in the terminal 810, or may be independently included in a mutual authentication start request message.

When the terminal 810 transmits the list (ListOfSupportedPushServices) of the event registration notification services in operation 8004, in operation 8005, the subscription relay server 830 may select at least one event registration notification service, which is also supported by the subscription relay server 830 itself, from the list (ListOfSupportedPushServices) of the event registration notification services transmitted by the terminal 810, and may selectively reply with the selected event registration notification service (SelectedPushService) to the terminal 810. In addition, when the terminal 810 transmits an event registration notification function support identifier (PushServiceSupport), the subscription relay server 830 may select at least one of the event registration notification services supported by itself in operation 8005. In addition, the subscription relay server 830 may include, in a response, a session identifier (TransactionID) capable of identifying a mutual authentication session currently in progress between the terminal 810 and the subscription relay server 830.

In operation 8006, the terminal 810 may identify a reply of the subscription relay server 830. When, in the reply of operation 8005, verification of a signature or certificate of the subscription relay server 830 fails, an event is identified to not exist, or an error is identified, the terminal 810 may end the process.

In operation 8006, the terminal 810 may verify whether the terminal 810 also supports the selected event registration notification service (SelectedPushService) replied with by the subscription relay server 830. If the verification fails, the terminal 810 may end the process.

In operation 8006, when an event registration notification service previously registered in the subscription relay server 830 exists, the terminal 810 may determine to cancel the corresponding event registration notification service.

In operation 8006, the terminal 810 may determine an event registration notification identifier (Push Token) to be used for the selected event registration notification service. The corresponding process may be determined by the interaction between an event registration notification server (not shown) and a push client (not shown) of the terminal, and may be performed before or together with this operation. In addition, the terminal 810 or the LPA (not shown) of the terminal 810 may connect and store the event registration notification identifier and the address of the subscription relay server 830.

In operation 8006, the terminal 810 may selectively generate a hash value of the determined event registration notification identifier. The hash value may be generated by using an algorithm such as secure hash algorithm (SHA)-0, SHA-1, or SHA-256. In addition, the hash value of the event registration notification identifier generated by the terminal may selectively include at least one of the following values:

an event registration notification identifier a session identifier (TransactionID)

a selected event registration notification service (SelectedPushService)

a previously registered event registration notification service cancellation request (DisablePushService)

The previously registered event registration notification service cancellation request (DisablePushService) may be included in the selected event registration notification service (SelectedPushService).

In operation 8007, the terminal 810 may selectively generate a digital signature of the eSIM (not shown) mounted in the terminal 810 such that the event registration notification identifier, the session identifier, the selected event registration notification service, the previously registered event registration notification service cancellation request, or the hash value of the event registration notification identifier is included. Before generating the corresponding digital signature, the eSIM may authenticate the subscription relay server 830.

In operation 8008, the terminal 810 may transmit a request for registration of an event registration notification identifier so that an event registration notification is made when an event related to the eSIM mounted in the terminal 810 is registered in the subscription relay server 830. The corresponding request may selectively include at least one of the following information:

an event identifier (EventID or MatchingID)
an event registration notification function support identifier of the terminal 810
an event registration notification identifier
a validity period, effective date, and number of uses of the event registration notification identifier
an event registration notification identifier hash value
a selected event registration notification service
a previously registered event registration notification service cancellation request
a session identifier (TransactionID)
an eUICC signature generated by an eUICC's secret key
an eUICC certificate and higher-level certificate
a signature verification function support identifier of the subscription relay server The previously registered event registration notification service cancellation request (DisablePushService) may be included in the selected event registration notification service (SelectedPushService).

In operation 8008, the subscription relay server 830 may authenticate the eUICC by verifying an eUICC identifier, the eUICC signature, and the eUICC certificate.

In operation 8008, the subscription relay server 830 may generate an event registration notification identifier hash value such that at least one of the transmitted event registration notification identifier, the session identifier, and the selected event registration notification service is included. In addition, the subscription relay server 830 may compare the hash value generated by itself and the event registration notification identifier hash value transmitted by the terminal.

In operation 8008, the subscription relay server 830 may connect and store the event registration notification identifier and an eUICC identifier (EID) of the terminal 810. This may be selectively performed when the hash value generated by the subscription relay server 830 is compared with the event registration notification identifier hash value transmitted by the terminal and the values are the same.

In operation 8008, the subscription relay server 830 may configure and store at least one of an effective date, a validity period, and the available number of uses of the event registration notification identifier. In addition, the event registration notification identifier may not be valid due to the expiration of the period or exceeding the number of uses. In addition, the subscription relay server 830 may store a time point when the terminal 810 is required to directly access the subscription relay server 830 in addition to the event registration notification function.

In operation 8008, when the terminal 810 transmits the previously registered event registration notification service cancellation request, the subscription relay server 830 may cancel the previously registered event registration notification service.

In operation 8008, the subscription relay server 830 may selectively retrieve a registered event corresponding to the event identifier and the eUICC identifier (EID) or the requested eUICC identifier (EID).

In operation 8009, the subscription relay server 830 may reply with a response message. In this case, the response message may selectively include at least one of the following:

an event registration notification service registration result
an event registration notification service registration cancellation result
an event registration notification identifier
an event registration notification identifier validity condition (a period, number of uses, etc.)
a time point of directly connecting to the subscription relay server in addition to an event registration notification In addition, the subscription relay server 830 may sign a part or all of the information by using a secret key of the subscription relay server 830.

In operation 8010, when the signature of the subscription relay server 830 is included in a reply value of the subscription relay server 830, the terminal 810 may verify the signature. When the verification fails, the terminal 810 may stop the process and display an error to a user (not shown).

In operation 8010, the terminal 810 may store, in the terminal 810, the currently-replied event registration notification identifier and address of the subscription relay server 830. In this case, the replied information may be stored in the LPA (not shown) installed in the terminal 810 or the eSIM (or eUICC) (not shown) mounted in the terminal 810.

Figure 9:
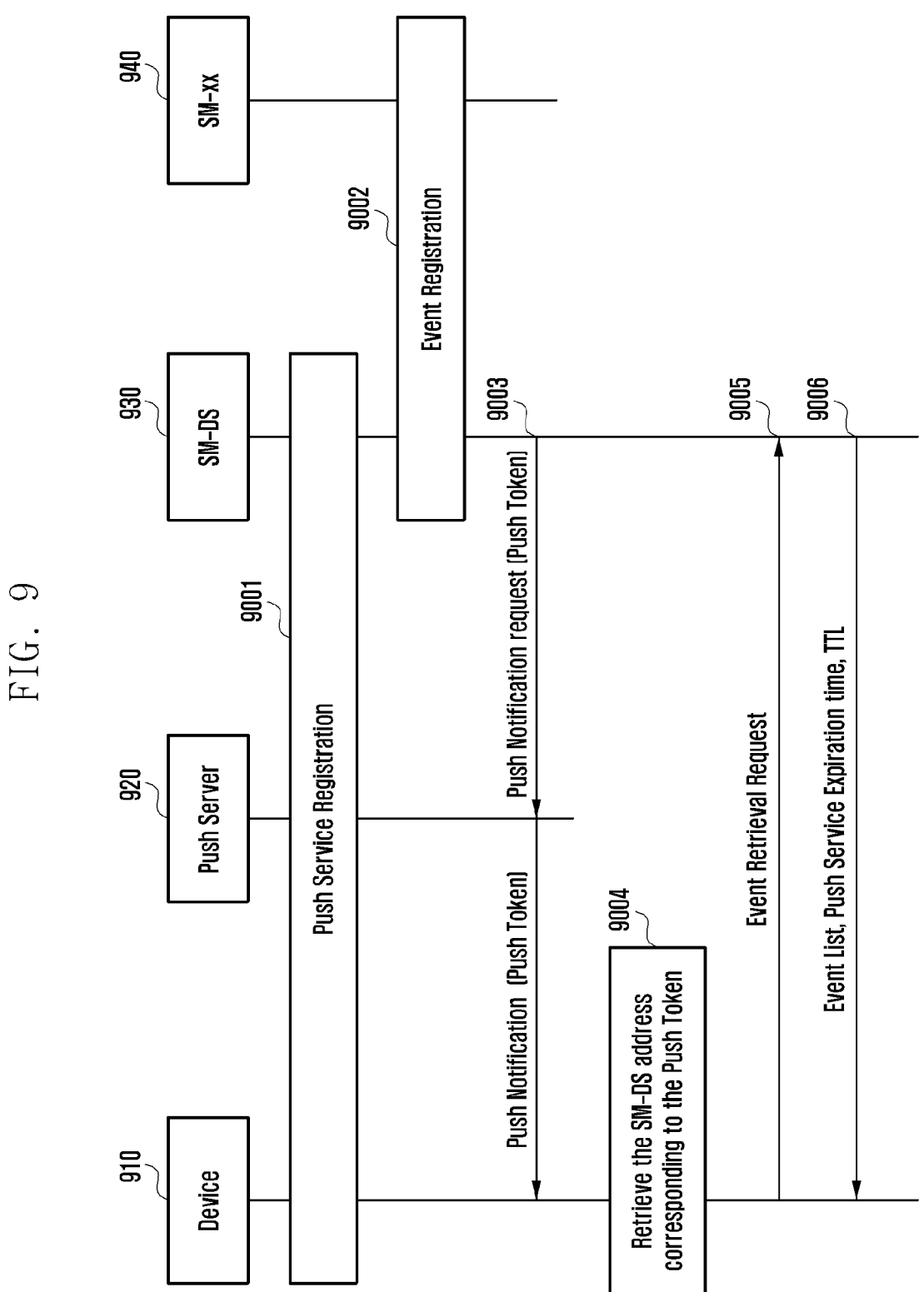
FIG. 9 illustrates another example of a message exchange procedure of a process in which a terminal and a subscrip- tion relay server use an event registration notification func- tion to identify whether an event exists and acquire the event according to various embodiments of the disclosure.

FIG. 9 illustrates another example of a message exchange procedure of a process in which a terminal and a subscription relay server use an event registration notification function to identify whether an event exists and acquire the event according to various embodiments.

In the embodiment of FIG. 9, a terminal 910 may be used interchangeably with an LPA (not shown) or an eSIM (not shown).

In operation 9001, the terminal 910 may determine an event registration notification identifier (Push Token) by interacting with at least one event registration notification server 920. In addition, as in the embodiments of FIGS. 5, 6, 7 and/or 8, the LPA (not shown) of the terminal 910 may perform an event registration notification identifier registration process for using an event registration notification function by using at least one subscription relay server (e.g., SM-DS) 930 stored in the eSIM (not shown) or the LPA (not shown) in the terminal 910.

In operation 9002, a profile providing server and/or an alternative subscription relay server 940 may register, in the subscription relay server 930, an event corresponding to an eUICC of the terminal 910.

In operation 9003, the subscription relay server 930 may determine information of the event registration notification server 920 and the event registration notification identifier connected to an eUICC identifier corresponding to the registered event. In addition, the subscription relay server 930 may transmit an event registration notification request including an event registration notification identifier to the event registration notification server 920, and the event registration notification server 920 may transmit an event registration notification including the event registration notification identifier to the terminal 910. In addition, an event registration notification message may selectively include a validity period during which an event can be acquired and/or a deadline for accessing the subscription relay server 930.

In operation 9004, the terminal 910 may determine the subscription relay server 930 having registered the event registration notification identifier transmitted as an event registration notification.

In operation 9005, the terminal 910 may transmit an event acquisition request message to the determined subscription relay server 930. The above request may be made during mutual authentication. The event acquisition request message may include an eUICC identifier, an eUICC signature, and/or an eUICC certificate of the terminal 910.

In operation 9006, the subscription relay server 930 may search for an event list corresponding to the eUICC identifier of the terminal 910 and transmit the same to the terminal 910. The terminal 910 having acquired the event/event list may use information included in the event/event list to access a target profile providing server or another subscription relay server.

In addition, in operation 9006, the subscription relay server 930 may configure, to the subscription relay server, information such as a validity period of an event registration notification function currently registered and used, and/or a deadline for which the terminal 910 is required to directly access the subscription relay server 930 via mutual authentication, and selectively reply with the information. When the information is received, the terminal 910 may be configured to access the target subscription relay server 930 via mutual authentication within a corresponding deadline, or to perform a new event registration notification identifier registration process (FIGS. 5, 6, 7, and/or 8).

Figure 10:
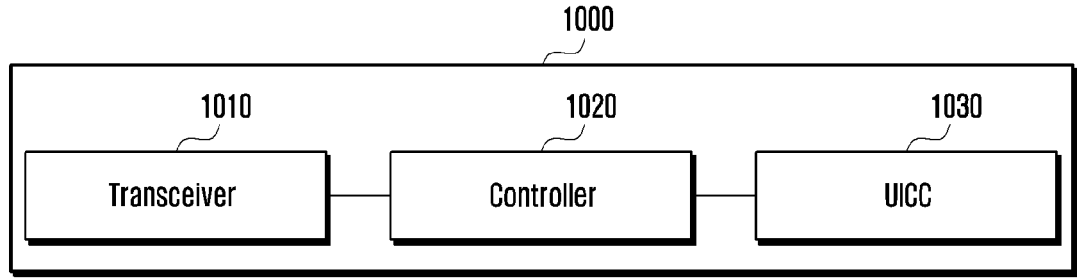
FIG. 10 illustrates components of a terminal according to an embodiment of the disclosure.

FIG. 10 illustrates components of a terminal according to an embodiment of the disclosure.

As shown in FIG. 10, a terminal 1000 may include a transceiver 1010 and a controller 1020. In addition, the terminal 1000 may include a UICC 1030. For example, the UICC 1030 may be inserted into the terminal 1000, and may be an eUICC embedded in the terminal 1000.

Figure 11:
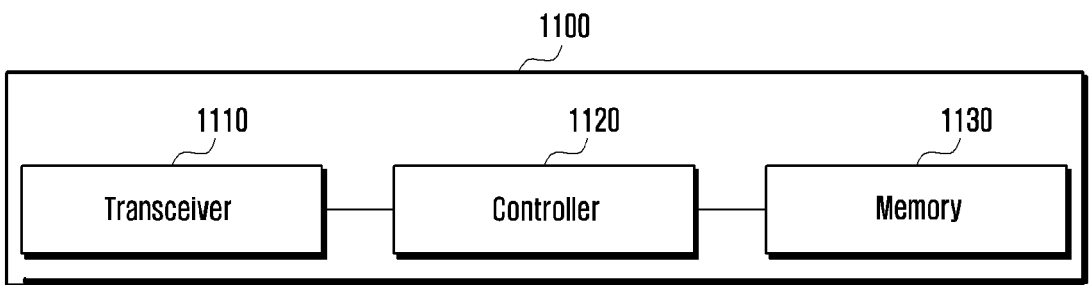
FIG. 11 illustrates components of a profile providing server according to an embodiment of the disclosure.
Figure 12:
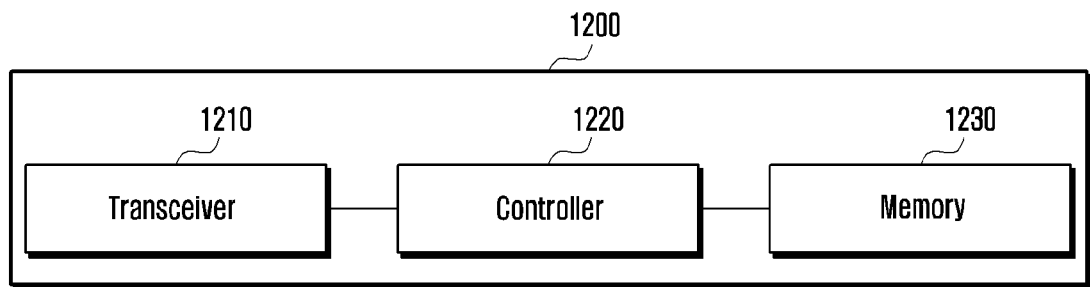
FIG. 12 illustrates components of a subscription relay server according to an embodiment of the disclosure.

The transceiver 1010 according to various embodiments may transmit and receive a signal, information, data, etc. according to various embodiments of the disclosure to and from a profile providing server 1100 of FIG. 11 or a subscription relay server 1200 of FIG. 12.

For example, the transceiver 1010 according to various embodiments may transmit a first message for requesting an event to the subscription relay server 1200.

The transceiver 1010 according to various embodiments may receive event-related information from the subscription relay server 1200 in response to the first message.

The transceiver 1010 according to various embodiments may transmit a second message for requesting an event to the profile providing server 1100, based on the event-related information.

For example, the subscription relay server 1200 according to various embodiments may include a first subscription relay server and a second subscription relay server.

The transceiver 1010 according to various embodiments may transmit a third message for requesting an event to the subscription relay server, based on second event-related information received from the first subscription relay server.

The transceiver 1010 according to various embodiments may receive first event-related information from the second subscription relay server in response to the third message.

The transceiver 1010 according to various embodiments may transmit the second message for requesting the event to the profile providing server 1100, based on the first event-related information.

For example, the second message according to various embodiments may further include at least one piece of information among information related to an acquisition path of the first event-related information and information related to the second subscription relay server having replied with the first event-related information.

In addition, the third message according to various embodiments may further include at least one piece of information among information related to an acquisition path of the second event-related information and information related to the first subscription relay server having replied with the second event-related information.

The transceiver 1010 according to various embodiments may receive event processing-related information from the profile providing server 1100 in response to the second message.

For example, the event processing-related information received from the profile providing server 1100 according to various embodiments may include information indicating an event processing failure.

According to various embodiments, the event processing-related information transmitted from the profile providing server 1100 may include information related to profile installation or remote management.

The controller 1020 may include at least one processor. Hereinafter, a controller may be interchangeably used with a processor.

The processor 1020 according to various embodiments may control the overall operation of the terminal 1000. The processor 1020 may control the overall operation of the terminal 1000 according to various embodiments of the disclosure as described above.

For example, the at least one processor 1020 according to various embodiments may identify an event processing exception list, and determine whether to process the event, based on the event-related information received from the subscription relay server 1200 and the event processing exception list.

In addition, the at least one processor 1020 according to various embodiments may control the transceiver 1010 to transmit the second message for requesting the event to the profile providing server 1100, based on the determination of whether to process the event and the event-related information, to receive the event processing-related information from the profile providing server 1100 in response to the second message, and to update the event processing exception list, based on the event processing-related information. For example, the at least one processor 1020 according to various embodiments may add the event-related information to the event processing exception list when the event processing-related information received from the profile providing server 1100 includes the information indicating the event processing failure.

The UICC 1030 according to various embodiments may download a profile and install the profile. In addition, the UICC 1030 may manage the profile.

The UICC 1030 may operate according to the control of the processor 1020. Alternatively, the UICC 1030 may include a controller or a processor for installing a profile, or an application may be installed in the UICC. A part of the application may be installed in the processor 1020.

The terminal 1000 may further include a memory (not shown), and may store data such as a basic program, an application program, and configuration information for the operation of the terminal 1000. In addition, the memory may include at least one storage medium among a flash memory type, a hard disk type, a multimedia card micro type, a card type memory (e.g., an SD or XD memory, etc.), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the processor 1020 may perform various operations by using various programs, contents, data, etc. stored in the memory.

FIG. 11 illustrates components of a profile providing server according to an embodiment of the disclosure.

The profile providing server 1100 according to various embodiments may include a transceiver 1110, a controller 1120, and a memory 1130.

The transceiver 1110 according to various embodiments may transmit and receive a signal, information, data, etc. according to various embodiments of the disclosure to and from the terminal 1000 of FIG. 10 or the subscription relay server 1200 of FIG. 12. For example, the transceiver 1110 may transmit information related to profile installation or remote management to the terminal.

For example, the transceiver 1110 according to various embodiments may receive an event request message from the terminal 1000.

For example, the event request message according to various embodiments may include event-related information, and the event-related information according to various embodiments may be based on information received by the terminal 1000 from the subscription relay server 1200.

The controller 1120 is a component for overall controlling the profile providing server 1100. The controller 1120 may include at least one processor. Hereinafter, a controller may be interchangeably used with a processor.

The processor 1120 may control the overall operation of the profile providing server 1100 according to various embodiments of the disclosure as described above.

For example, the at least one processor 1120 according to various embodiments may control the transceiver 1110 to determine validity of the event-related information included in the event request message received from the terminal 1100, and to transmit event processing-related information to the terminal, based on the validity determination of the event-related information.

For example, when the event-related information is valid, the event processing-related information according to various embodiments may include the information related to profile installation or remote management.

In addition, when the event-related information is invalid, the event processing-related information according to various embodiments may include information indicating an event processing failure.

The at least one processor 1120 according to various embodiments may control the transceiver 1110 to transmit an event deletion request message to the subscription relay server when event processing is completed.

The event request message according to various embodiments may further include at least one piece of information among information related to an acquisition path of the event-related information and information related to the subscription relay server 1200.

The at least one processor 1120 according to various embodiments may control the transceiver to transmit an event deletion request message to the subscription relay server 1200, based on at least one piece of information among the information related to the acquisition path of the event-related information and the information related to the subscription relay server 1200.

The memory 1130 of the profile providing server 1100 may store data such as a basic program, an application program, and configuration information for the operation of the profile providing server 1100. In addition, the memory may include at least one storage medium among a flash memory type, a hard disk type, a multimedia card micro type, a card type memory (e.g., an SD or XD memory, etc.), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the processor 1120 may perform various operations by using various programs, contents, data, etc. stored in the memory.

FIG. 12 illustrates components of a subscription relay server according to an embodiment of the disclosure.

The subscription relay server 1200 according to various embodiments may include a transceiver 1210, a controller 1220, and a memory 1230.

The transceiver 1210 according to various embodiments may transmit and receive a signal, information, data, etc. according to various embodiments of the disclosure to and from the terminal 1000 of FIG. 10 or the profile providing server 1100 of FIG. 11. For example, the transceiver 1210 may transmit event-related information to the terminal. For example, the transceiver 1210 according to various embodiments may receive an event request message from the terminal.

For example, the event request message according to various embodiments may include the event-related information, and the event-related information according to various embodiments may be based on information received by the terminal 1000 from another subscription relay server (not shown).

The controller 1220 is a component for overall controlling the profile providing server 1200. The controller 1220 may include at least one processor. Hereinafter, a controller may be interchangeably used with a processor.

The processor 1220 may control the overall operation of the subscription relay server 1200 according to various embodiments of the disclosure as described above.

For example, the at least one processor 1220 according to various embodiments may control the transceiver 1210 to receive an event registration request message from the profile providing server 1100 or another subscription relay server (not shown) in order to register an event.

The at least one processor 1220 according to various embodiments may register the event in response to the event registration request message.

The registered event according to various embodiments may be related to an event generated by the profile providing server 1100.

For example, when the transceiver 1210 receives the event registration request message from the another subscription relay server, the registered event may be an event obtained by modulating the event generated by the profile providing server.

The at least one processor 1220 according to various embodiments may control the transceiver 1210 to receive an event deletion request message from the profile providing server 1100, and delete the registered event, based on the event deletion request message.

The event registration request message according to various embodiments may include information related to a termination time point of the event.

For example, the at least one processor 1220 according to various embodiments may delete the event, based on the information related to the termination time point of the event.

The event registration request message according to various embodiments may include information related to event deletion notification.

For example, the at least one processor 1220 according to various embodiments may control the transceiver 1210 to notify the profile providing server 1100 of event deletion, based on the information related to the event deletion notification.

The memory 1230 of the subscription relay server 1200 may store data such as a basic program, an application program, and configuration information for the operation of the subscription relay server 1200. In addition, the memory may include at least one storage medium among a flash memory type, a hard disk type, a multimedia card micro type, a card type memory (e.g., an SD or XD memory, etc.), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the processor 1220 may perform various operations by using various programs, contents, data, etc. stored in the memory.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and/or B," "A, B, or C," "at least one of A, B, and/or C" may include all possible combinations of the items enumerated together in a corresponding one of the phrases. As used herein, such terms as "a first", "a second", "the first", and "the second" may modify corresponding elements regardless of the importance or order thereof, and may be used to simply distinguish a corresponding element from another, and does not limit the elements. It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including instructions that are stored in a storage medium (e.g., an internal memory or external memory) that is readable by a machine (e.g., a computer). The machine is a device that can invoke the stored instructions from the storage medium and operate according to the invoked instructions, and may include terminals (e.g., the first terminal 210 or the second terminal 210) according to various embodiments. When the instructions are executed by a processor, the processor may perform functions corresponding to the instructions, with or without using one or more other components under the control of the processor. The instructions may include codes generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the above-describe sub elements may be omitted or other sub elements may be further included in various embodiments. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
  transmitting, to a subscription manager discovery service (SM-DS), remote subscriber identity module (SIM) provisioning (RSP) capability information of the terminal including information indicating a support for a push service of the terminal;
  receiving, from the SM-DS, information indicating a support for the push service of the SM-DS and a list of push services supported by the SM-DS;
  selecting a push service based on the list of the push services supported by the SM-DS;
  transmitting, to the SM-DS, information on the selected push service, a push token for the selected push service, and an embedded universal integrated circuit card (eUICC) signature, wherein the eUICC signature is generated based on the information on the selected push service and the push token;
  receiving, from the SM-DS, a response message including a result of registration of the selected push service, wherein the response message further includes time information associated with validity of the push token; and
  enabling the selected push service.

2. The method of claim 1, wherein, in case that verification for an SM-DS signature included in the response message returns an error status, a push service registration procedure is stopped.

3. The method of claim 1, wherein the information on the selected push service is used for verifying whether the selected push service is supported by the SM-DS, and
  wherein the push token is stored within the SM-DS, and is associated with an eUICC identifier (EID) corresponding to the terminal.

4. A method performed by a subscription manager discovery service (SM-DS) in a wireless communication system, the method comprising:
  receiving, from a terminal, remote subscriber identity module (SIM) provisioning (RSP) capability information of the terminal including information indicating a support for a push service of the terminal;
  transmitting, to the terminal, information indicating a support for the push service of the SM-DS and a list of push services supported by the SM-DS;
  receiving, from the terminal, information on a selected push service, a push token for the selected push service, and an embedded universal integrated circuit card (eUICC) signature generated based on the information on the selected push service and the push token; and
  transmitting, to the terminal, a response message including a result of registration of the selected push service, wherein the response message further includes time information associated with validity of the push token, wherein the selected push service is enabled.

5. The method of claim 4, wherein the response message includes an SM-DS signature, and wherein, in case that verification for the SM-DS signature included in the response message returns an error status, a push service registration procedure is stopped.

6. The method of claim 4, further comprising:
  transmitting, to a push service server corresponding to the push service registered by the terminal, a notification of event registration in case that the SM-DS receives event information associated with an eUICC identifier (EID) of the terminal.

7. The method of claim 4, further comprising:
  identifying whether the selected push service is supported by the SM-DS based on the information on the selected push service; and
  storing the push token in association with an eUICC identifier (EID) corresponding to the terminal.

8. A terminal in a wireless communication system, the terminal comprising:
  a transceiver; and
  a controller configured to:
    transmit, to a subscription manager discovery service (SM-DS) via the transceiver, remote subscriber identity module (SIM) provisioning (RSP) capability information of the terminal including information indicating a support for a push service of the terminal,
    receive, from the SM-DS via the transceiver, information indicating a support for the push service of the SM-DS and a list of push services supported by the SM-DS,
    select a push service based on the list of the push services supported by the SM-DS,
    transmit, to the SM-DS via the transceiver, information on the selected push service, a push token for the selected push service, and an embedded universal integrated circuit card (eUICC) signature, wherein the eUICC signature is generated based on the information on the selected push service and the push token,
    receive, from the SM-DS via the transceiver, a response message including a result of registration of the selected push service, wherein the response message further includes time information associated with validity of the push token, and
    enable the selected push service.

9. The terminal of claim 8, wherein, in case that verification for an SM-DS signature included in the response message returns an error status, a push service registration procedure is stopped.

10. The terminal of claim 8, wherein the information on the selected push service is used for verifying whether the selected push service is supported by the SM-DS, and
  wherein the push token is stored within the SM-DS, and is associated with an eUICC identifier (EID) corresponding to the terminal.

11. A subscription manager discovery service (SM-DS) in a wireless communication system, the SM-DS comprising:
  a transceiver; and
  a controller configured to:
    receive, from a terminal via the transceiver, remote subscriber identity module (SIM) provisioning (RSP) capability information of the terminal including information indicating a support for a push service of the terminal,
    transmit, to the terminal via the transceiver, information indicating a support for the push service of the SM-DS and a list of push services supported by the SM-DS, receive, from the terminal via the transceiver, informa-
tion on a selected push service, a push token for the
selected push service, and an embedded universal
integrated circuit card (eUICC) signature generated
based on the information on the selected push service
and the push token, and transmit, to the terminal via the transceiver, a response
message including a result of registration of the
selected push service, wherein the response message
further includes time information associated with
validity of the push token, wherein the selected push service is enabled.

12. The SM-DS of claim 11, wherein the response mes-
sage includes an SM-DS signature, and wherein, in case that verification for the SM-DS signature
included in the response message returns an error
status, a push service registration procedure is stopped.

13. The SM-DS of claim 11, wherein the controller is
further configured to: transmit, to a push service server
corresponding to the push service registered by the terminal
via the transceiver, a notification of event registration in case
that the SM-DS receives event information associated with
an eUICC identifier (EID) of the terminal.

14. The SM-DS of claim 11, wherein the controller is
further configured to: identify whether the selected push service is supported by
the SM-DS based on the information on the selected
push service, and store the push token in association with an eUICC iden-
tifier (EID) corresponding to the terminal.

* * * * *